(12) United States Patent
Rivera et al.

(10) Patent No.: US 11,902,318 B2
(45) Date of Patent: Feb. 13, 2024

(54) NETWORK VISUALIZATION, INTRUSION DETECTION, AND NETWORK HEALING

(71) Applicant: Alliance for Sustainable Energy, LLC, Golden, CO (US)

(72) Inventors: Joshua Eli Rivera, Thornton, CO (US); Vivek Kumar Singh, Ames, IA (US); Evan Vladislav Michael Vaughan, Golden, CO (US); Adarsh Hasandka, Lakewood, CO (US); Joshua Van Natta, Denver, CO (US); Bruno Mauricio Salvatico, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 379 days.

(21) Appl. No.: 17/069,320

(22) Filed: Oct. 13, 2020

(65) Prior Publication Data

US 2021/0112090 A1  Apr. 15, 2021

Related U.S. Application Data

(60) Provisional application No. 62/913,232, filed on Oct. 10, 2019.

(51) Int. Cl.
*G06F 21/55* (2013.01)
*H04L 9/40* (2022.01)

(52) U.S. Cl.
CPC ........ *H04L 63/1441* (2013.01); *G06F 21/552* (2013.01); *G06F 21/554* (2013.01); *H04L 63/1416* (2013.01); *H04L 63/1425* (2013.01)

(58) Field of Classification Search
CPC ............ G05B 23/0205; G05B 23/0289; G05B 2219/31457; G05B 23/0235; G05B 23/02; G05B 15/02; G05B 2219/31265; G05B 2219/31337; G05B 2219/32201; G05B 2219/32404; G05B 23/0243; (Continued)

(56) References Cited

U.S. PATENT DOCUMENTS 8,448,221 B2  5/2013  Pearcy et al.
9,729,558 B2  8/2017  Liu et al.
(Continued)

FOREIGN PATENT DOCUMENTS

AU  2021105857 A4  11/2021
CN  106685928 A  *  5/2017  ......... H04L 63/1416
(Continued)

OTHER PUBLICATIONS

Chih-Che Sun, Adam Hahn, Chen-Ching Liu, "Cyber security of a power grid: State-of-the-art", International Journal of Electrical Power & Energy Systems, vol. 99, pp. 45-56 (Year: 2018).*
(Continued)

*Primary Examiner* — Farid Homayounmehr
*Assistant Examiner* — Zhimei Zhu
(74) *Attorney, Agent, or Firm* — Michael A. McIntyre

(57) ABSTRACT

The present disclosure is related to a cyber-security system that includes a Supervisory Control and Data Acquisition (SCADA) network monitor configured to receive a data set from a power system network, an event manager, and a mitigation system, where the SCADA network monitor includes an anomaly detector.

9 Claims, 23 Drawing Sheets

(58) Field of Classification Search
CPC ...... G05B 23/0245; G05B 2219/31093; G05B 2223/06; G05B 1/01; G05B 2219/2639; H04L 67/12; H04L 63/1441; H04L 63/1416; G06F 21/552; G06F 21/554; G06F 2221/034

See application file for complete search history.

(56) References Cited

U.S. PATENT DOCUMENTS

| | | | |
|---|---|---|---|
| 9,992,215 | B2 | 6/2018 | Eslambolchi et al. |
| 10,063,580 | B2 | 8/2018 | Dekel et al. |
| 10,142,355 | B2 | 11/2018 | Thanos et al. |
| 10,148,686 | B2 | 12/2018 | Hassanzadeh et al. |
| 10,250,619 | B1 | 4/2019 | Park et al. |
| 10,452,845 | B2 | 10/2019 | Mestha et al. |
| 10,635,822 | B2 | 4/2020 | Steele et al. |
| 10,673,870 | B2 | 6/2020 | Pierce et al. |
| 10,887,347 | B2 | 1/2021 | Koren et al. |
| 10,979,391 | B2 | 4/2021 | Weinberger et al. |
| 11,165,815 | B2 | 11/2021 | Trost et al. |
| 11,190,529 | B2 | 11/2021 | Stuck |
| 11,194,906 | B2 | 12/2021 | Li et al. |
| 2009/0300156 | A1 | 12/2009 | Yalakanti et al. |
| 2011/0288692 | A1* | 11/2011 | Scott ................. H04L 63/20 700/297 |
| 2016/0065603 | A1 | 3/2016 | Dekel et al. |
| 2016/0205123 | A1 | 7/2016 | Almurayh |
| 2017/0142067 | A9 | 5/2017 | Pietrowicz et al. |
| 2018/0255078 | A1* | 9/2018 | Papillon .............. H04L 63/1491 |
| 2018/0276375 | A1 | 9/2018 | Arov et al. |
| 2019/0253440 | A1 | 8/2019 | Mathur et al. |
| 2021/0320928 | A1 | 10/2021 | Stuck |

FOREIGN PATENT DOCUMENTS

| | | |
|---|---|---|
| CN | 111935063 A | 11/2020 |
| CN | 112291239 B | 9/2021 |
| EP | 3 855 692 A1 | 7/2021 |
| WO | 2018/136875 A1 | 7/2018 |
| WO | 2020/028008 A1 | 2/2020 |
| WO | 2021/236661 A1 | 11/2021 |

OTHER PUBLICATIONS

He, H. and Yan, J. (2016), "Cyber-physical attacks and defences in the smart grid: a survey". IET Cyber-Phys. Syst., Theory Appl., 2016, vol. 1, Iss. 1, pp. 13-27 (Year: 2016).*
Tomlin, Leary Jr.; Farnam, Marsella R.; and Pan, Shengyi, "A Clustering Approach to Industrial Network Intrusion Detection" (2016). Information Security Research and Education (INSuRE) Conference. 5. (Year: 2016).*
A. Ashok, M. Govindarasu and J. Wang, "Cyber-Physical Attack-Resilient Wide-Area Monitoring, Protection, and Control for the Power Grid," in Proceedings of the IEEE, vol. 105, No. 7, pp. 1389-1407, Jul. 2017 (Year: 2017).*
Chih-Che Sun, Adam Hahn, Chen-Ching Liu, "Cyber security of a power grid: State-of-the-art", International Journal of Electrical Power & Energy Systems, vol. 99, 2018, pp. 45-56, (Year: 2018).*
P. I. Radoglou-Grammatikis and P. G. Sarigiannidis, "Securing the Smart Grid: A Comprehensive Compilation of Intrusion Detection and Prevention Systems," in IEEE Access, vol. 7, pp. 46595-46620, 2019 (Year: 2019).*
"Summary of the North American SynchroPhasor Initiative (NASPI) Activity Area", U.S. Department of Energy, Electricity Delivery & Energy Reliability, Transmission Reliability and Renewables Integration Program Fact Sheet, available at https://www.energy.gov/sites/prod/files/North%20American%20Synchrophasor%20Initiative%20%28NASPI%29%20Program%20Factsheet.pdf, Jun. 2012, pp. 1-3.
Adhikari et al., "Applying Hoeffding Adaptive Trees for Real-Time Cyber-Power Event and Intrusion Classification", IEEE Transactions on Smart Grid, Sep. 2018, vol. 9, No. 5, pp. 4049-4060.
Amin et al., "RIDES: Robust Intrusion Detection System for IP-Based Ubiquitous Sensor Networks", Sensors, 2009, vol. 9, pp. 3447-3468.
Beasley et al., "Cyber security evaluation of synchrophasors in a power system", 2014 Clemson University Power Systems Conference, Clemson, SC, pp. 1-5.
Borges Hink, et al., "Machine learning for power system disturbance and cyber-attack discrimination", 2014 7th International Symposium on Resilient Control Systems (ISRCS), 2014, pp. 1-8.
Cheung et al., "Using Model-based Intrusion Detection for SCADA Networks", Proceeding of the SCADA Security Scientific Symposium, 2007, Miami Beach, Florida, pp. 1-12.
Gürdür Broo et al., "Visual Analytics for Cyber-physical Systems Development: Blending Design Thinking and Systems Thinking", NordDesign 2018, Linköping, Sweden Conference Paper, Aug. 14-17, 2018, pp. 1-15.
Hai et al., "Hybrid Intusion Detection System for Wireless Sensor Networks", International Conference on Computational Science and Its Applications 2007, LNCS 4706, Computational Science and Its Applications—ICCSA 2007, Jan. 2007, pp. 383-396.
Huffer et al., "Stucco System", Oak Ridge National Laboratory, ORNL/SPR-2017/527, Oct. 3, 2017, pp. 1-34.
Khan et al., "Model based intrusion detection system for synchrophasor applications in smart grid," 2017 IEEE Power & Energy Society General Meeting, Chicago, IL, Jul. 2017, pp. 1-5.
Li et al., "Intrusion detection system using Online Sequence Extreme Learning Machine (OSELM) in advanced metering infrastructure of smart grid", PLOS One, Feb. 27, 2018, pp. 1-16.
Lin et al., "Self-Healing Attack-Resilient PMU Network for Power System Operation," IEEE Transactions on Smart Grid, May 2018, vol. 9, No. 3, pp. 1551-1565.
Linda et al., "Neural network-based intrusion detection system for critical infrastructures," 2009 International Joint Conference on Neural Networks, Jun. 2009, Atlanta, GA, pp. 1827-1834.
Morris et al., "Cybersecurity Testing of Substation Phasor Measurement Units and Phasor Data Concentrators," Proceedings of the Seventh Annual Workshop on Cyber Security and Information Intelligence, Oct. 2011, Article No. 24, pages.
Pan et al., "Developing a Hybrid Intrusion Detection System Using Data Mining for Power Systems," in IEEE Transactions on Smart Grid, Nov. 2015, vol. 6, No. 6, pp. 3104-3113.
Pasikhani et al., "A New Distributed Learning Based Algorithm for Network Intrusion Detection System", Journal of Engineering and Applied Sciences, 2017, vol. 12, No. 6, pp. 1523-1537.
Rossey et al., "LARIAT: Lincoln Adaptable Real-time Information Assurance Testbed", Aerospace Conference Proceedings, IEEE Feb. 2002, vol. 6, pp. 6-2671-6-2682.
Shepard et al., Evaluation of the Vulnerability of Phasor Measurement Units to GPS Spoofing Attacks, International Journal of Critical Infrastructure Protection, Dec. 2012, vol. 5, Nos. 3-4, pp. 146-153.
Singh et al., "HIDES: Hybrid Intrusion Detector for Energy Systems", 2020 IEEE Texas Power and Energy Conference (TPEC), 2020, pp. 1-6.
Singh et al, "SHARP-Net: Platform for Self-Healing and Attack Resilient PMU Networks", 2020 IEEE Power & Energy Society Innovative Smart Grid Technologies, 2020, pp. 1-6.
Udd et al., "Exploiting Bro for Intrusion Detection in a SCADA System", Proceedings of the 2nd ACM International Workshop on Cyber-Physical System Security (CPSS '16), May 2016, ACM, New York, NY, USA, pp. 44-51.
Valli, "Snort IDS for SCADA Networks," Proceedings of WorldCOMP2009, Security and Management, 2009, pp. 618-621.
Verba et al., "Idaho National Laboratory Supervisory Control and Data Acquisition Intrusion Detection System (SCADA IDS)", 2008 IEEE International Conference on Technologies for Homeland Security, INL/CON-08-13946, May 2008 pp. 1-6.
Yang et al., "Rule-based intrusion detection system for SCADA networks", 2nd IET Renewable Power Generation Conference, Sep. 2013, Beijing, pp. 1-4.
Yang et al., "Multi-attribute SCADA-Specific Intrusion Detection System for Power Networks", IEEE Transactions on Power Delivery, Jun. 2014, vol. 29, No. 3, pp. 1092-1102.

(56) References Cited

OTHER PUBLICATIONS

Yang et al., "Intrusion Detection System for Network Security in Synchrophasor Systems", IET International Conference on Information and Communications Technologies (IETICT 2013), Apr. 27-29, 2013, pp. 1-7.

Zekrifa, "Hybrid Intrusion Detection System", A Thesis Submitted in Partial Fulfillment of the Requirements for the Degree of Ph.D. of Ccomputer Science, The University of South Australia, Jun. 19, 2014, pp. 1-192.

\* cited by examiner

| IDS RULES 800 | | |
|---|---|---|
| RULE NAME | ATTACK TYPE | IDS RULE |
| RULE_1 | Denial of Service (DoS) | If packet_latency < threshold or packet_size > threshold Alert_Type = "DoS"; Compromised_IP { }; Alert_Severity { } |
| RULE_2 | ARP Spoofing (Man in the Midde) | If IP address not in Whitelist Alert_Type = "ARP Spoofing"; Compromised_IP { }; Alert_Severity { } |

FIGURE 8

NETWORK VISUALIZATION, INTRUSION DETECTION, AND NETWORK HEALING

CROSS REFERENCE TO RELATED APPLICATIONS

The present application claims the benefits of and priority, under 35 U.S.C. § 119(e), to U.S. Provisional Application Ser. No. 62/913,232, filed on Oct. 10, 2019, entitled "NETWORK VISUALIZATION, INTRUSION DETECTION, AND NETWORK HEALING." The entire disclosure of the application listed above is hereby incorporated by reference, in its entirety, for all that it teaches and for all purposes.

CONTRACTUAL ORIGIN

This invention was made with government support under Contract No. DE-AC36-08G028308 awarded by the Department of Energy. The government has certain rights in the invention.

SUMMARY

An aspect of the present disclosure is a first cyber-security system that includes a supervisory control and data acquisition (SCADA) network monitor configured to receive a first data set from a power system network, an event manager, and a mitigation system, where the SCADA network monitor includes a first anomaly detector. The first anomaly detector is configures to compare the first data set to a modeled data set to identify in the first data set a first anomaly occurring in the power system network, and in response to identifying the first anomaly, pass a first alert signal corresponding to the first anomaly to the event manager. The event manager is configured to evaluate the first alert signal and when the event manager determines that the first alert signal corresponds to at least one of an intrusion or an undesirable event, pass the first alert signal to the mitigation system. In response to receiving the first alert signal, the mitigation system is configured to perform a first corrective action affecting the power system network.

In some embodiments of the present disclosure, the first data set may include at least one of timing data, frequency data, and/or range data. In some embodiments of the present disclosure, the first data set may include timing data, and where the modeled data set includes a packet latency threshold. In some embodiments of the present disclosure, the first data set may include range data, and where the modeled data set includes a packet size range. In some embodiments of the present disclosure, the first data set may include frequency data, and where the modeled data set comprises a packet frequency threshold. In some embodiments of the present disclosure, the mitigation system may be configured to receive, from the event manager, the first alert signal, process the first alert signal, and send a control signal to a namespace container orchestrator, where the namespace container orchestrator is configured to isolate the at least one of the intrusion or the undesirable event and reconfigure the power system network.

An aspect of the present disclosure is a second cyber-security system that includes a synchrophasor network monitor configured to receive time-stamped phasor data from a power system network, an event manager, and a mitigation system, where the synchrophasor network monitor includes a second anomaly detector configured to compare the time-stamped phasor data to a learning data set to identify in the time-stamped phasor data a second anomaly occurring in the power system network. In response to identifying the second anomaly, the second anomaly detector is configured to pass a second alert signal corresponding to the second anomaly to the event manager. The event manager is configured to evaluate the second alert signal and when the event manager determines that the second alert signal corresponds to at least one of an intrusion or an undesirable event, pass the second alert signal to the mitigation system. In response to receiving the second alert signal, the mitigation system is configured to perform a second corrective action affecting the power system network.

In some embodiments of the present disclosure, the time-stamped phasor data may include at least one of a voltage and/or a current. In some embodiments of the present disclosure, the mitigation system may be configured to receive, from the event manager, the second alert signal, process the second alert signal, and send a control signal to a namespace container orchestrator. The namespace container orchestrator may be configured to isolate the at least one of the intrusion or the undesirable event and reconfigure the power system network. In some embodiments of the present disclosure, the synchrophasor network monitor may include a Phasor Data Concentrator (PDC), where the time-stamped phasor data is received from a Phasor Measurement Unit (PMU).

An aspect of the present disclosure is a third cyber-security system that includes a supervisory control and data acquisition (SCADA) network monitor configured to receive a second data set from a power system network, an event manager, and a mitigation system, where the SCADA network monitor includes a third anomaly detector configured to compare the second data set to a historical data set to identify in the second data set a third anomaly in the power system network and in response to identifying the third anomaly, pass a third alert signal corresponding to the third anomaly to the event manager. The event manager is configured to evaluate the third alert signal and when the event manager determines that the third alert signal corresponds to at least one of an intrusion or an undesirable event, pass the third alert signal to the mitigation system. In response to receiving the third alert signal, the mitigation system is configured to perform a third corrective action affecting the power system network.

In some embodiments of the present disclosure, the second data set may include a whitelist including at least one of a MAC address, an IP address, an ethernet port number, a network port number, a transport port number, a SCADA protocol, and/or a SCADA function code. In some embodiments of the present disclosure, the mitigation system may be configured to receive, from the event manager, the third alert signal, process the third alert signal, and send a control signal to a namespace container orchestrator. The namespace container orchestrator may be configured to isolate the at least one of the intrusion or the undesirable event and reconfigure the power system network. In some embodiments of the present disclosure, the historical data set may include a known attack signature.

An aspect of the present disclosure is a mitigation system for a power system network, where the mitigation system includes a namespace container orchestrator, where the mitigation system is configured to receive, from an event manager, an alert signal corresponding to at least one of an intrusion and/or an undesirable event, process the alert signal, and send a control signal to the namespace container orchestrator. The namespace container orchestrator is configured to isolate the at least one of the intrusion or the undesirable event, and reconfigure the power system network.

An aspect of the present disclosure is a mitigation system for a power system network, where the mitigation system includes a network controller configured to manage a software defined network portion of the power system network, a namespace container orchestrator configured to modify, in response to a control signal, a network configuration of an element in the software defined network portion of the power system network, and direct a new network configuration of the element of the software defined network portion of the power system network to the network controller.

An aspect of the present disclosure is a multi-layered real-time visualization server to visualize a power system network, where the visualization server includes a processor and a computer readable storage medium having stored thereon an instruction, where, when the instruction is to be executed, the processor is configured to generate a first visualization layer, where the first visualization layer depicts a power system element of the power system network, generate a second visualization layer, where the second visualization layer depicts a communication network element of a communication network, and transfer, for display on a user interface, the first visualization layer overlaid with the second visualization layer.

An aspect of the present disclosure is a first cyber-security method that includes receiving, via a supervisory control and data acquisition (SCADA) network monitor, a first data set from a power system network; comparing, via a first anomaly detector, the first data set to a modeled data set to identify in the first data set a first anomaly occurring in the power system network; in response to identifying the first anomaly, pass a first alert signal corresponding to the first anomaly to an event manager; evaluating, via the event manager, the first alert signal; in response to determining that the first alert signal corresponds to at least one of an intrusion or an undesirable event, passing the first alert signal to a mitigation system; and performing, in the mitigation system and after receiving the first alert signal, a first corrective action affecting the power system network.

In some embodiments of the present disclosure, a first cyber-security may further include receiving, via a synchrophasor network monitor, time-stamped phasor data from the power system network; receiving, in a second anomaly detector via the SCADA network monitor, the first data set; generating, from at least one of the first data set or the time-stamped phasor data, a learning data set; comparing the time-stamped phasor data to the learning data set to identify in the time-stamped phasor data a second anomaly occurring in the power system network; in response to identifying the second anomaly, passing a second alert signal corresponding to the second anomaly to the event manager; evaluating, in the event manager, the second alert signal; when the event manager determines that the second alert signal corresponds to at least one of an intrusion or an undesirable event, passing the second alert signal to the mitigation system; and performing, in the mitigation system and in response to receiving the second alert signal, a second corrective action affecting the power system network.

In some embodiments of the present disclosure, first cyber-security method may further include receiving a second data set from the power system network; comparing, via a third anomaly detector, the second data set to a historical data set to identify in the second data set a third anomaly occurring in the power system network; in response to identifying the third anomaly, passing a third alert signal corresponding to the third anomaly to the event manager; evaluating, via the event manager, the third alert signal; when the event manager determines that the third alert signal corresponds to at least one of an intrusion or an undesirable event, passing the third alert signal to the mitigation system; and performing, via the mitigation system, a third corrective action affecting the power system network.

FIELD

The present disclosure is generally directed to a method and system for virtualization, real-time visualization, and intrusion detection and mitigation in Power Systems. The present disclosure includes, among other things, a cyber-security intrusion detection system to detect, mitigate, and visualization undesirable events (e.g., anomalies, attacks, intrusions, faults) in Supervisory Control and Data Acquisition (SCADA) power systems.

BACKGROUND

An electrical grid or power grid is an interconnected network for delivering electricity to consumers. The main components of the electrical or power grid are generating stations, electrical substations, and transmission lines. Electricity travels between multiple stations and lines on route from the power source to the final service locations. The electrical grid consists of physical hardware and devices as well as virtual devices and software. Electrical grids are prone to malicious intrusions or attacks and there is a need for security. Additionally, the electrical grid may be managed using computer systems and/or may be connected to communication networks (e.g., the Internet, which creates additional cyber threats). Electrical grids may incorporate supervisory control and data acquisition (SCADA) systems to analyze and gather real-time data. SCADA systems may be used to monitor and control equipment in the electrical grid. However, SCADA networks are also not inherently secure (e.g., they lack authentication/encryption).

A challenge in the field of cyber-security is the large amount of data that is captured, which makes it difficult to identify abnormalities in systems. Additionally, the large amount of data collected makes recognizing optimization and improvements difficult. For example, during only a few minutes of operation, gigabytes of data may be generated (e.g., system logs, packet captures, power values, etc.). Furthermore, the data often needs to be aggregated, parsed, analyzed, and stored. Additionally, in the field of networking and information security, there is a significant advantage in having a way to visually analyze different events as they impact a system.

In traditional deployment, applications were run on physical servers, this was an inefficient use of resources and not very scalable. After traditional deployment, organizations moved to virtualized deployment, where multiple virtual machines (VMs) were run on a single physical server. Virtualization allowed applications to be isolated between virtual machines and offered improved resource utilization and scalability. However, each virtual machine was a full machine running its own components, including its own Operating System (OS), on top of the virtualized hardware.

In computing, namespacing allows the isolation of resources per process or a group of processes. Control groups limit the amount of resources used per process or group of processes (e.g., bandwidth). Containers are an operating system independent software method to perform a similar function to namespacing and control groups. That is to say, containers are a software method to package code and all its dependencies for an application. In other words, an application or process has a specific grouping of resources assigned to it. Containers are similar to virtual machines but share the OS among applications. A container has its own filesystem, CPU, memory, process space, etc., decoupled from the underlaying infrastructure such that the containers are portable across clouds and OS distributions.

The proposed technology can eliminate cyber-securities technologies' weaknesses by providing a robust multi-component platform that performs intrusion detection, intrusion mitigation, and real-time visualization of a power system network and detected intrusions.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 8 illustrates a table of intrusion detection system (IDS) rules in accordance with embodiments of the present disclosure;

DETAILED DESCRIPTION

Figure 1:
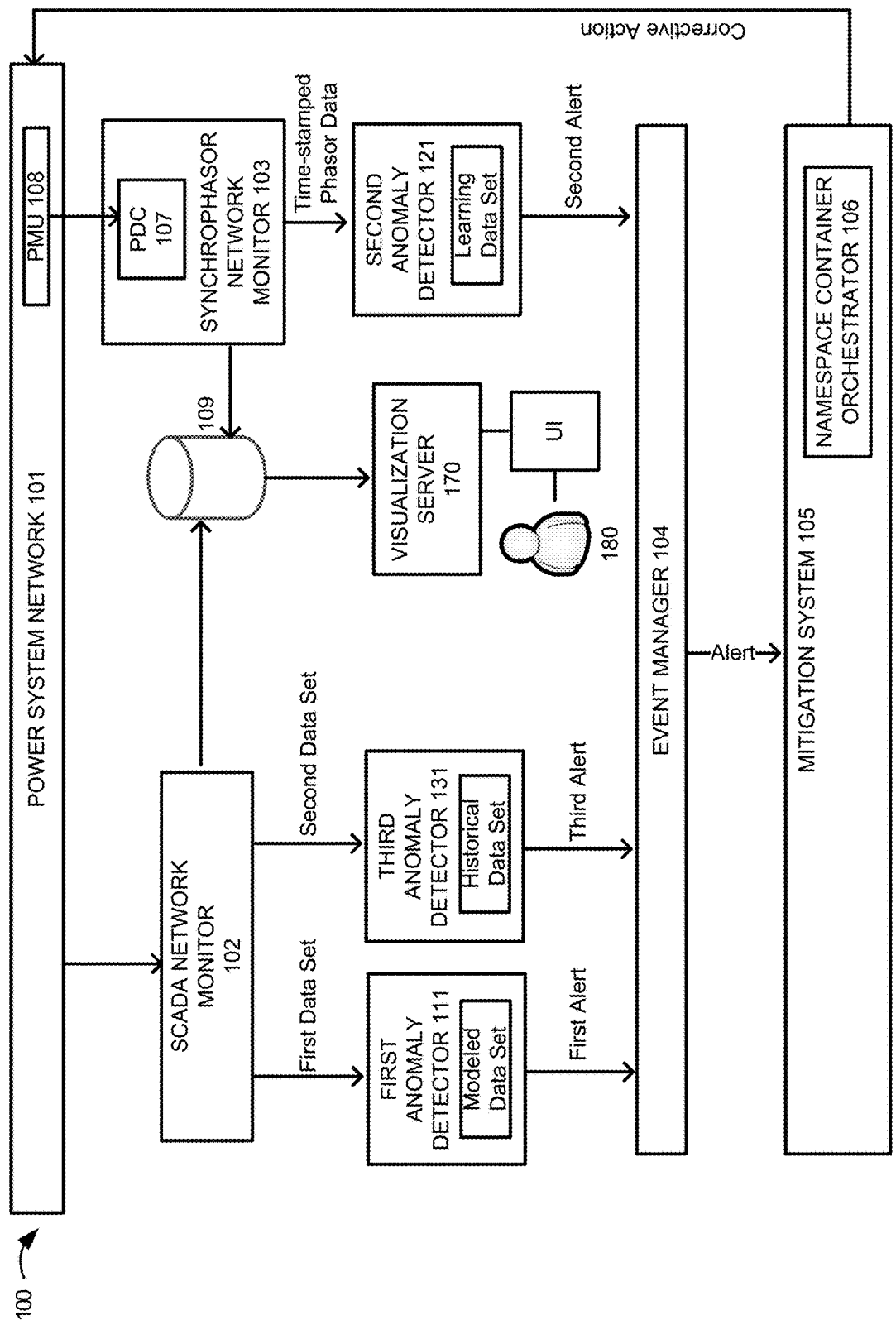
FIG. 1 illustrates a block diagram of a cyber-security system for a power system network, where the cyber-security system includes virtualization, real-time visualization, intrusion detection, and mitigation in accordance with embodiments of the present disclosure.

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

It should be appreciated that embodiments of the present disclosure can be utilized in numerous systems for the visualization of a power system networks and/or communication networks; and the detection and mitigation of intrusions in such networks.

Furthermore, while the illustrative embodiments herein show the various components of a cyber-security system collocated, it is to be appreciated that the various components of such a system may be located at distant portions of a distributed network, such as a communication network and/or the Internet, or within a dedicated secure, unsecured, and/or encrypted system. Thus, it should be appreciated that the components of a cyber-security system can be combined into one or more devices. As will be appreciated from the following description, and for reasons of computational efficiency, the components of a cyber-security system can be arranged at any location within a distributed network without affecting the operation of the system. For example, the various components can be located in a local server, at one or more users' premises, or some combination thereof.

In some embodiments of the present disclosure, a visualization server may provide a real-time three-dimensional (3D) visualization of large-scale environments including cyber-physical devices. Real-time visualization enables users to observe (from multiple perspectives), analyze, and/or control the system (e.g. power system network). Visualization can also quickly highlight abnormalities/attacks. Visualization of abnormalities/attacks may include varying arc height and color to indicate the abnormalities/attacks. The granularity of the view may be user configurable. In some embodiments of the present disclosure, a system may properly format the data based on a zoom level selected by a user, such that the data is formatted/processed to be properly displayed based on the user selected granularity. A visualization of a system may be multilayered to logically visualize a power grid/system, including a multitude of devices, a geographic context for reference, and a communication network with its full diversity of networked components. For example, a first layer may include power system network elements. A second layer may include elements of a communication network and a third layer may provide a geographic context. The different layers may be overlaid, or viewed individually. Additionally, a visualization system may be animated such that activity of a power system network and/or a communication network may be illustrated.

Among other things, the methods and systems of the present disclosure may be able to integrate physical hardware devices with emulated devices (e.g., hardware in the loop). In some embodiments of the present disclosure, methods and systems may be capable of streaming, collecting, storing, transporting, filtering, and/or visualizing all data within an environment (e.g., electrical power system and/or communication network). Further, a visualization server may enable high-fidelity visualization of events in real-time as well as forensic analysis based on historical data. In some embodiments of the present disclosure, a cyber-security system may include three main components: intrusion detection, intrusion mitigation, and system visualization. Such a system may collect Supervisory Control and Data Acquisition (SCADA) cyber logs and PMU data on a common platform that then later, among other things, performs anomaly detection and alert visualization in real-time, according to some embodiments of the present disclosure. Further, a cyber-security system may provide the ability to inspect and/or analyze packets of a power system network and/or communication network using physical and emulated devices. In some embodiments of the present disclosure, emulation using virtualization may be used to create and deploy virtual systems, containers, switches, etc. As described herein, an event manager (centralized data handler) may run in parallel to process, collect, and/or parse data from each individual data stream, to send out buffered updates of data to a database, and/or to send out separately buffered updates of data to a visualization server. An event manager may collect all the individual visual updates and periodically flush the buffer by publishing bulk updates. Update intervals and selected streams may be adjusted based on expected data intensity in each stream. Data may be collected, parsed, and/or formatted for the event manager to process.

As described below, in some embodiments of the present disclosure, an intrusion detection system may detect cyber-attacks in power system networks. For example, an intrusion detection system may integrate logical system behavior, protocol-specific knowledge, and/or data-based learning to develop a comprehensive solution targeting power system networks and/or communication networks, including supervisory control and data acquisition (SCADA) systems. Advantageously, such an intrusion detection system may identify and mitigate any detected intrusion/undesirable event. Additionally, in some embodiments of the present disclosure, an intrusion detection system may integrate multiple intrusion detection systems to further enhance intrusion detection. For example, a hybrid intrusion detection system may combine a signature-based IDS, model-based IDS, learning-based IDS, and/or synchrophasor data to detect unknown, coordinated, and/or stealthy cyber-attacks targeting a power system network, e.g. a SCADA network.

Thus, in some embodiments of the present disclosure, an intrusion detection system may utilize state-of-the-art machine learning to continuously improve intrusion detection within a power system network. An intrusion detection system may use synchrophasor measurements and cyber logs to learn patterns of different scenarios based on spatio-temporal behaviors of power system networks. Such a system may include three layers: Layer 1 includes a model-based IDS that uses a set of specific rules that may be developed based on the spatio-temporal behavior of power system networks during cyber-attacks and normal operation; Layer 2 includes synchrophasor measurements to detect cyber-attacks; and layer 3 includes a signature-based IDS that detects anomalies based on known attack signatures that can be identified by analyzing cyber logs. As described herein, data from all three layers may be compiled and machine learning may be used to apply a decision tree algorithm to improve detection of stealthy cyber-attacks. In some embodiments of the present disclosure, an intrusion detection system may provide detailed classification of different types of anomalies happening on a cyber-physical level. Further, a system may include a novel architecture for the intrusion detection system to allow the integration of power and cyber data in real-time to support real-time detection and visualization.

In some embodiments of the present disclosure, at least two data streams may be funneled into an intrusion detection system. The first data stream may include network communications and other data stream containing phasor measurements. These two streams of data may flow in through a SCADA network monitor and Synchrophasor network monitor, respectively. They are further described in the paragraphs below. In some embodiments of the present disclosure, all processes, with the exception of historical data aggregation and offline learning, may be performed in real time.

Further, an intrusion detection system may utilize both power and cyber network activities to detect different types of intrusions in the context of cyber-physical security (CPS) in a smart grid. The benefit of the intrusion detection system is at least three-fold. First such a system can detect anomalies beyond the traditional information technology-based (IT-based) IDS solutions while minimizing detection latency by assessing the network integrity in real time, a security feature that is often overlooked. In addition, the intrusion detection system can leverage machine-learning to implement and model different types of attacks and intrusions, which minimizes the blind spots of traditional IDS tools, while achieving better classification results with minimal delay (latency). Further, such intrusion detection systems can display the relevant cyber log and power system data simultaneously on a visualization platform to perform real-time evaluation and/or 3D visualization.

In some embodiments of the present disclosure, an intrusion detection system may detect anomalies during cyber-attacks on a power system network and/or a communication network based on the rules defined in the intrusion detection system and the resulting alerts generated may be published to a mitigation system through an event manager. Once an anomaly is detected, the generated alert may be delivered to the mitigation system through the event manager to take corrective actions. The corrective actions may include, among other things, reconfiguring the power system network and/or communication network to isolate the compromised device, and reconfiguring the power system network and/or communication network to connect a new device to replace the compromised device. Thus, examples of corrective actions taken by the mitigation system of a cyber-security system may include, update/upgrade/patch, redeployment, isolate, and/or reconfigure. For the case of update/upgrade/patch, if a system vulnerability is identified, the vulnerable element (e.g., container, virtual machine, and/or SDN) may be patched using continuous integration (CI) and/or continuous deployment (CD). Once patched, the patched element (e.g., container, virtual machine, and/or SDN) may be redeployed using CI and/or CD. In some embodiments of the present disclosure, a namespace container orchestrator may redeploy a container, virtual machine, and/or SDN back to a working/functional state. For an actual cyber-attack, the affected elements of the power system network may be isolated, (i.e. quarantined). For example, a namespace container orchestrator and/or event manager may perform deep monitoring of the isolated/quarantined elements of the system. Further, for a system cyber-attack, a namespace container orchestrator may reconfigure at least one of a network VLANs, a container, and/or a virtual machine.

In some embodiments of the present disclosure, a visualization server may provide real-time three-dimensional (3D) visualization of large-scale environments involving cyber-physical devices. Such a visualization server may integrate real, physical hardware along with emulated devices communicating with each other as part of the same system. A visualization server may also be capable of visualizing all data within an emulated environment (data from the physical devices that pass through the emulated environment may also be collected and visualized). A visualization server may provide a high-fidelity visual analysis of events in real time as well as the use of historical data for forensic analysis. In other words, a visualization server may allow a user to replay events associated with stored data.

Further, a visualization server may provide an interface viewable through a single web interface (e.g., web browser), which can provide users with a vantage from which to observe and/or interact with a power system network and/or a communication network. A visualization server can quickly highlight any detected the anomalies and/or attacks and allow users to interact with the cyber-security system to initiate corrective actions via a mitigation system, as described herein. In some embodiments, a mitigation system may perform corrective action without user interaction.

In some embodiments of the present disclosure, a visualization server may provide an interface that is able to logically visualize the electric grid, including a multitude of electric devices, and the communications network with the full diversity of networked components. Additionally, a visualization server may include a geographic context for reference. A visualization server may ensure that this wide variety of data sets is presented clearly and understandable to the user. For example, too many elements on the screen at once can become visually distracting and fail to convey any useful information. On the other hand, too few elements may cause the view to become so abstract as to be usable. Each element should communicate clearly what it represents with as little superfluous data possible.

TABLE 1

Terms and Definitions

| ID# | Terms | Definition |
| --- | --- | --- |
| 102 | SCADA Network Monitor | A filtered schematic that identifies all SCADA communications of interest on a given network. It sniffs the SCADA network traffic using a network tap interface (software for network virtualization) in real-time. SCADA-supervisory control and data acquisition. Supervisory Control and Data Acquisition (SCADA) is a control system architecture that uses computers, networked data communications and graphical user interfaces for high-level process supervisory management but uses other peripheral devices such as programmable logic controller (PLC) and discrete PID controllers to interface with the process plant or machinery. The operator interfaces that enable monitoring and the issuing of process commands, such as controller set point changes, are handled through the SCADA computer system. However, the real-time control logic or controller calculations are performed by networked modules that connect to the field sensors and actuators. The SCADA concept was developed as a universal means of remote access to a variety of local control modules, which could be from different manufacturers allowing access through standard automation protocols. In practice, large SCADA systems have grown to become very similar to distributed control systems in function but using multiple means of interfacing with the plant. They can control large-scale processes that can include multiple sites, and work over large distances as well as small distance. It is one of the most commonly used types of industrial control systems, however there are concerns about SCADA systems being vulnerable to cyberwarfare/cyberterrorism attacks. |
| 103 | Synchrophasor Network Monitor | A power system network that consists of phasor measurement units (PMUs a device used to estimate the magnitude and phase angle of an electrical phasor quantity (such as voltage or current) in the electricity grid using a common time source for synchronization) and local phasor data concentrators (local PDCs-receives and time-synchronizes phasor data from multiple phasor measurement units (PMUs) to produce a real-time, time-aligned output data stream. A PDC can exchange phasor data with |

TABLE 1-continued

Terms and Definitions

| ID# | Terms | Definition |
|---|---|---|
|  |  | PDCs at other locations. Through use of multiple PDCs, multiple layers of concentration can be implemented within an individual synchrophasor data), where PMUs send the phasor measurements to local PDCs using IEEE C37.118 protocol. |
| 104 | Event Manager | A centralized management system that manages alerts generated from all three intrusion detectors (signature, model, and learning-based IDS) through log parsers by performing the logical processing based on the defined logic rules to prioritize alert types. The defined logic rules provide the final identification of events and real-time output is displayed to support alert-visualization and situational awareness. |
| 105 | Mitigation System | This component performs the substation-based local PDC namespace orchestration as needed to configure several virtual PDCs based on the system topology. The configured virtual local PDCs receive PMU measurements and forward them to the central PDC. Initially, the proposed IMS operates in the armed mode, and once an anomaly is detected, it activates the namespace orchestrator to remove the compromised substation PDCs, and replaces them with new substation PDCs. The central PDC also receives alert messages and new network addresses to initiate the connection with new substations PDC to restore the connection. |
| 106 | Namespace Container Orchestrator | The namespace container orchestrator provides a virtualization environment that can orchestrate virtual machine snapshots inside of a software defined network (SDN). It is capable of deploying virtual machines through a scripting engine based on the commands received from a centralized node. The orchestration can be divided into several namespaces, which are separate instances of contained virtual machines. This separation allows for a quick teardown and redeployment of virtual instances without affecting other virtual systems. Further, the scripting engine can be created and modified, which enables re-orchestration of compromised virtual machines in real time, as required during the attack mitigation process. |
| 107 | Phasor Data Concentrator (PDC) | A data concentrator receives and time-synchronizes phasor data from multiple phasor measurement units (PMUs) to produce a real-time, time-aligned output data stream. A PDC can exchange phasor data with PDCs at other locations. Through use of multiple PDCs, multiple layers of concentration can be implemented within |
| 108 | Phasor Measurement Unit (PMU) | an individual synchrophasor data), where PMUs send the phasor measurements to local PDCs using IEEE C37.118 protocol. Phasor measurement units (PMUs) are devices used to estimate the magnitude and phase angle of an electrical phasor quantity (such as voltage or current) in the electricity grid. |
| 109 | Database (e.g. relational) | A centralized database that facilitates the real-time integration of phasor measurements collected from phasor data concentrators, alert logs, from the event manager, by relating them with a common timestamp to develop the heterogeneous database. In the relational table, the timestamp is working as a relation variable, and attributes include phasor measurements and intrusion alert logs. Data may also be used to train the machine-learning algorithm. |
| 110/111 | First (Model-based) Intrusion Detection System/First Anomaly Detector | An intrusion detection system that detects cyberattacks using threshold-based rules that are defined using spatiotemporal behavior of power system during the malicious and normal events. |
| 120/121 | Second (Machine learning-based) Intrusion Detection System/Second Anomaly Detector | An intrusion detection system that applies machine learning algorithms, such as decision tree (DT), to learn the behavior of different cyber-physical events, such as line faults, cyberattacks, and normal events to detect different classes of anomalies in the power system. It receives the phasor measurements and alert logs from model-based IDS as input features and detect different types of events using a decision tree algorithm during real-time testing. |
| 130/131 | Third (Signature-based) Intrusion Detection System/Third Anomaly Detector | An intrusion detection system that detects cyberattacks based on the specific patterns as signatures of anomalies. It analyzes SCADA packet contents against the defined rules to identify known anomalies. |
| 112 | Hybrid Intrusion Detection System | An intrusion detection system that detects cyberattacks using a combination of two or more of: threshold-based rules that are defined using spatiotemporal behavior of power system during the malicious and normal events, machine learning algorithms, such as decision tree (DT), to learn the behavior of different cyber-physical events, and/or specific patterns as signatures of anomalies. |
| 160 | Software Defined Network (e.g., portion) | Software-defined networking (SDN) technology is an approach to network management that enables dynamic, programmatically efficient network configuration in order to improve network performance and monitoring. |
| 150 | Network Controller | The network controller is a centralized network component consisting of one or more |

TABLE 1-continued

Terms and Definitions

| ID# | Terms | Definition |
|---|---|---|
| | | controllers, which are considered the brain of the SDN network where the whole intelligence is incorporated. |
| 170 | Real-time Visualization Server | The real-time Visualization Server provides an interface through a single web interface, which provide a user with a vantage from which to observe a power system, a communication network, and quickly highlights the anomalies and attacks, and allows user to interact with the system for in-depth analysis. A user, within the interface to the visualization server, might quickly set up an environment, from small-scaled microgrids with a few subnets up to city-size grids with thousands of networks, either on local hardware or remotely on a server. |

FIG. 1 illustrates a block diagram of a cyber-security system 100 for detecting cyber-attacks to a power system network 101, where the cyber-security system 100 includes a visualization server 170, a supervisory control and data acquisition (SCADA) network monitor 102, a synchrophasor network monitor 103, a first anomaly detector 111, a second anomaly detector 121, a third anomaly detector 131, a storage database 109, an event manager 104, and a mitigation system 105, according to some embodiments of the present disclosure. As shown in FIG. 1, the synchrophasor network monitor 103 of this exemplary cyber-security system 100 may include at least one of a phasor measurement unit (PMU) 108 and/or a phasor data collector (PDC) 107. A mitigation system 105 may include a namespace container orchestrator 106.

In this example, the cyber-security system 100 may detect cyber-attacks occurring to a power system network 101 by utilizing a SCADA monitor 102. In some embodiments of the present disclosure, the cyber-security system 100 may integrate logical system behavior, protocol-specific knowledge, and/or data-based learning to develop a comprehensive solution identifying and/or mitigating attacks and/or other undesirable events occurring to a power system network 101. In some embodiments of the present disclosure, a cyber-security system 100 may integrate a first anomaly detector 111 (e.g., a model-based IDS), a second anomaly detector 121 (e.g., a machine-learning based IDS), and/or a third anomaly detector 131 (e.g., a signature-based IDS). Synchrophasor data collected via a synchrophasor network monitor 103 may be used to detect unknown, coordinated, and/or stealthy cyber-attacks targeting the SCADA networks. Such a cyber-security system 100 may also utilize state-of-the-art machine learning to continuously improve intrusion detection. The exemplary cyber-security system 100 shown in FIG. 1 also illustrates the use of synchrophasor measurements and cyber logs to learn patterns of different scenarios based on spatio-temporal behaviors of the power system network 101.

Referring again to FIG. 1, in some embodiments of the present disclosure, at least two data streams may be funneled from a power system network 101 into a cyber-security system 100 via a SCADA network monitor 102 and a synchrophasor network monitor 103. The first data stream may include, among other things, network communications (via the SCADA network monitor 102) and other data containing phasor measurements (via the synchrophasor network monitor 103).

Such a cyber-security system 100 may detect anomalies resulting from cyberattacks on a power system network 101 and/or a communication network (not shown) based on the rules defined in a first anomaly detector 111, a second anomaly detector 121, and/or a third anomaly detector 131, generates alerts, and then publish the generated alerts to a mitigation system 105 through an event manager 104. Once an intrusion/undesirable event is detected, the generated alert may be delivered to a mitigation system 105 through the event manager 104 to take corrective actions. In some embodiments of the present disclosure, a corrective action may include, among other things, at least one of reconfiguring the power system network 101 and/or communication network to isolate the compromised device, and reconfiguring the power system network 101 and/or the communication network to connect a new device to replace the compromised device.

In some embodiments of the present disclosure, a visualization server 170 may provide real-time three-dimensional (3D) visualization of large-scale environments involving cyber-physical devices. A visualization server 170 may allow for the environment to include real, physical hardware (e.g., a PMU 108) along with emulated devices (e.g., a PDC 107) communicating with each other as part of the same cyber-security system 100. The visualization server 170 may provide a high-fidelity visual analysis of events in real time to a user 180.

Further, a visualization server 170 may generate a user interface (UI) viewable through a single web interface (not shown), which can provide the user 180 with a vantage from which to observe and/or interact with a power system network 101 and/or a communication system network. Thus, a visualization server 170 may quickly highlight any detected intrusions/attacks/undesirable events (e.g., visual indication, animation, etc.), and allows the user 180 to interact with the cyber-security system 100 to initiate corrective actions. So, as defined herein, a cyber-security system 100 includes at least one of visualization server 170, an anomaly detector (111, 121, and/or 131), and/or a mitigation system 105

Figure 2A:
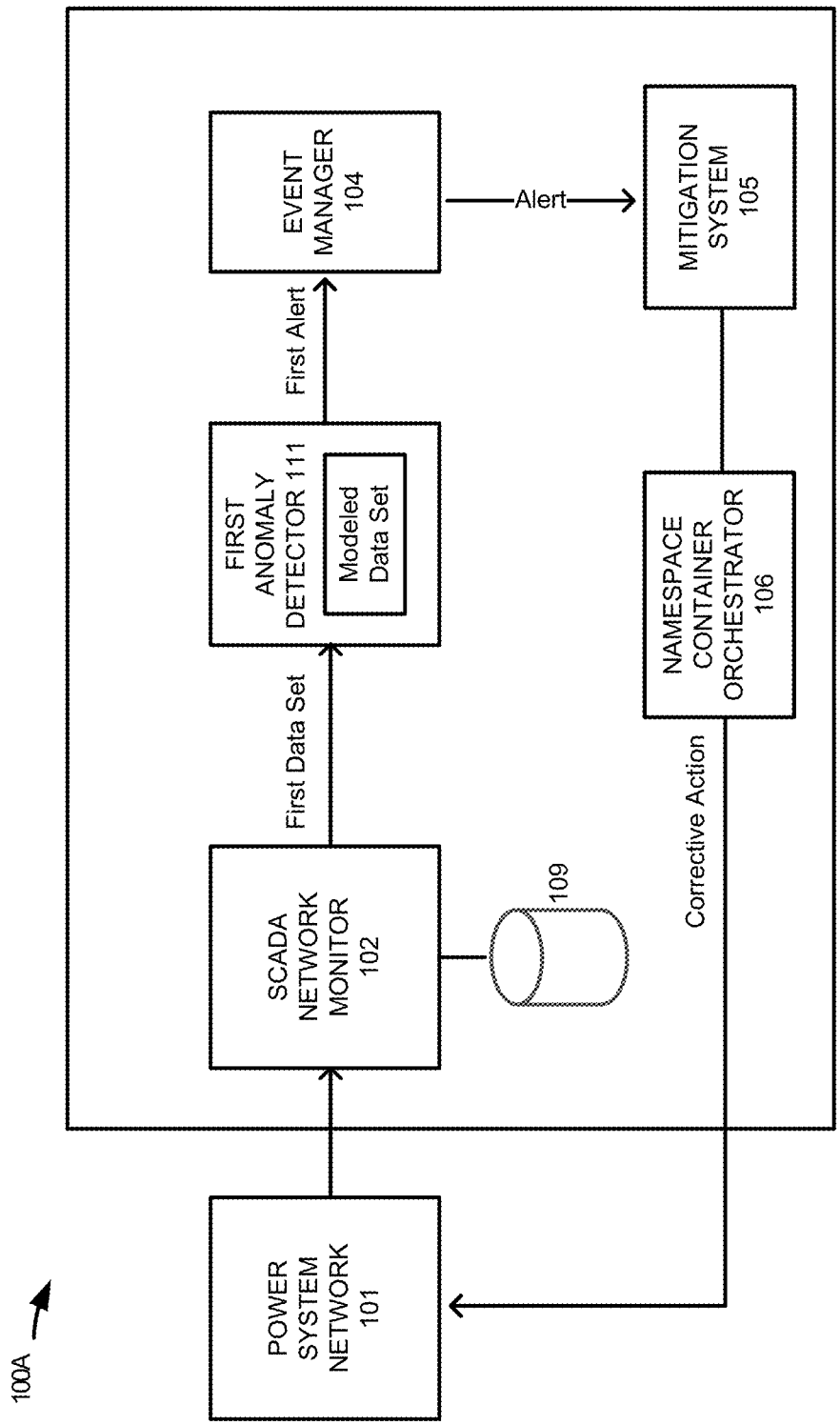
FIG. 2A illustrates a block diagram of a first cyber-security system (that includes a model-based intrusion detection system and a mitigation system) for a power system network in accordance with embodiments of the present disclosure.

FIG. 2A illustrates a cyber-security system 100A for detecting cyber-attacks to a power system network 101 where the cyber-security system 100A includes a first anomaly detector 111, according to some embodiments of the present disclosure. This exemplary cyber-security system 100A includes a SCADA network monitor 102, an event manager 104, a mitigation system 105, a namespace container orchestrator 106, a database 109, and a first anomaly detector 111. In this example, the first anomaly detector 111 of a cyber-security system 100A includes a model-based IDS. As described herein, a namespace container orchestrator 106 for a mitigation system 105 can effectively manage virtual image snapshots and create an encapsulated software defined network (SDN) environment. Once an intrusion is detected, the mitigation system 105 may activate the namespace container orchestrator 106 to remove the one or more compromised substations (e.g., a PDC) and replace a compromised PDC with new substation PDC. In some embodiments of the present disclosure, a standby PDC may be instantiated at the same time as the compromised PDC, but a standby PDC may not connected to the power network system 101.

In this exemplary embodiment, a SCADA network monitor 102 may receive a first data set from a power system network 101. The first data set may include, among other things, SCADA packets. A first anomaly detector 111 may then compare the first data set to a modeled data set to identify in the first data set a first anomaly occurring in the power system network 101. In response to identifying the first anomaly, the first anomaly detector 111 may pass a first alert signal corresponding to the first anomaly to an event manager 104. The event manager 104 may then evaluate the first alert signal and when the event manager 104 determines that the first alert signal corresponds to an intrusion and/or an undesirable event, the event manager 104 may then pass the first alert signal to a mitigation system 105. In response to receiving the first alert signal, the mitigation system 105 may then perform a first corrective action affecting the power system network 101, as described herein. For example, a first anomaly detector 111 may check packet latency, and when the packet latency is below a threshold value of the modeled data set, an anomaly may be considered to be detected. In yet another example, a first anomaly detector 111 may verify a packet size of each SCADA packet, and an anomaly may be considered to be detected when the packet size exceeds a threshold value of the modeled data set.

Figure 2B:
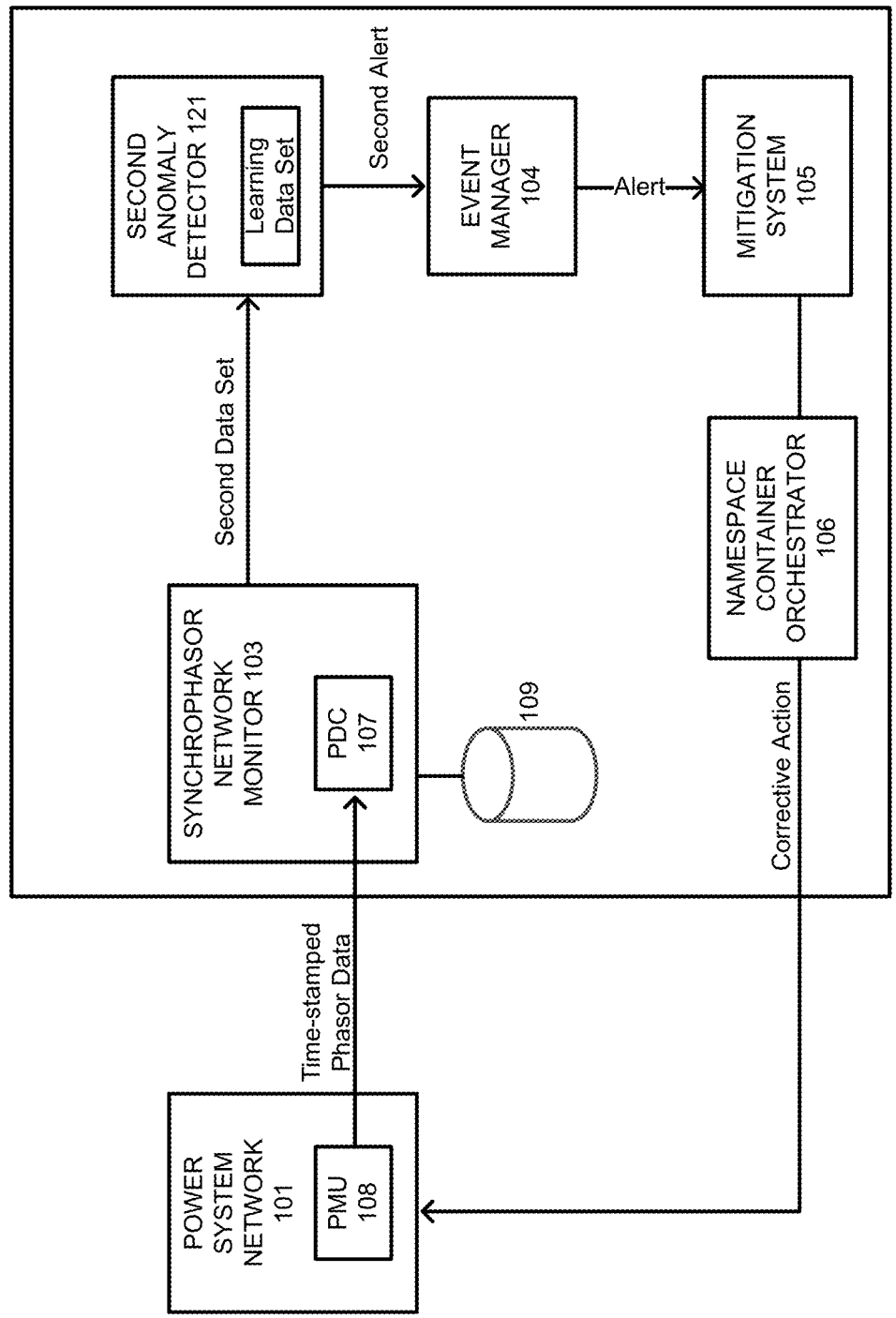
FIG. 2B illustrates a block diagram of a second cyber-security system (e.g., a learning-based intrusion detection system) for a power system network in accordance with embodiments of the present disclosure.

FIG. 2B illustrates a cyber-security system 100B for a power system network 101 and a second anomaly detector 121, according to some embodiments of the present disclosure. In this example, the power system network 101 includes PMU 108. This exemplary cyber-security system 100B includes a synchrophasor network monitor 103, an event manager 104, a mitigation system 105, a namespace container orchestrator 106, a database 109, and a second anomaly detector 121. In some examples, the second anomaly detector 121 may be based on a machine-learning IDS. Similar to FIG. 2A, a namespace container orchestrator 106 may effectively manage virtual image snapshots and create an encapsulated SDN environment. Once an intrusion is detected, the mitigation system 105 may activate a namespace container orchestrator 106 to remove one or more compromised substations (e.g., a PDC) and replace the compromised PDC with new substation PDC.

In some embodiments of the present disclosure, a synchrophasor network monitor 103 may be configured to receive time-stamped phasor data from a power system network 101. In some examples, the time-stamped phasor data may be received via a PMU 108 connected to a PDC 107. As shown in FIG. 2B, a second anomaly detector 121 may be configured to compare the time-stamped phasor data to a learning data set to identify in the time-stamped phasor data a second anomaly occurring in the power system network 101. In response to identifying the second anomaly, the second anomaly detector 121 may pass a second alert signal corresponding to the second anomaly to an event manager 104. The event manager 104 may be configured to evaluate the second alert signal, and when the event manager 104 determines that the second alert signal corresponds to an intrusion or an undesirable event, the event manager 104 may then pass the second alert signal to a mitigation system 105. In response to receiving the second alert signal, the mitigation system 105 may perform a second corrective action affecting the power system network 101.

Figure 2C:
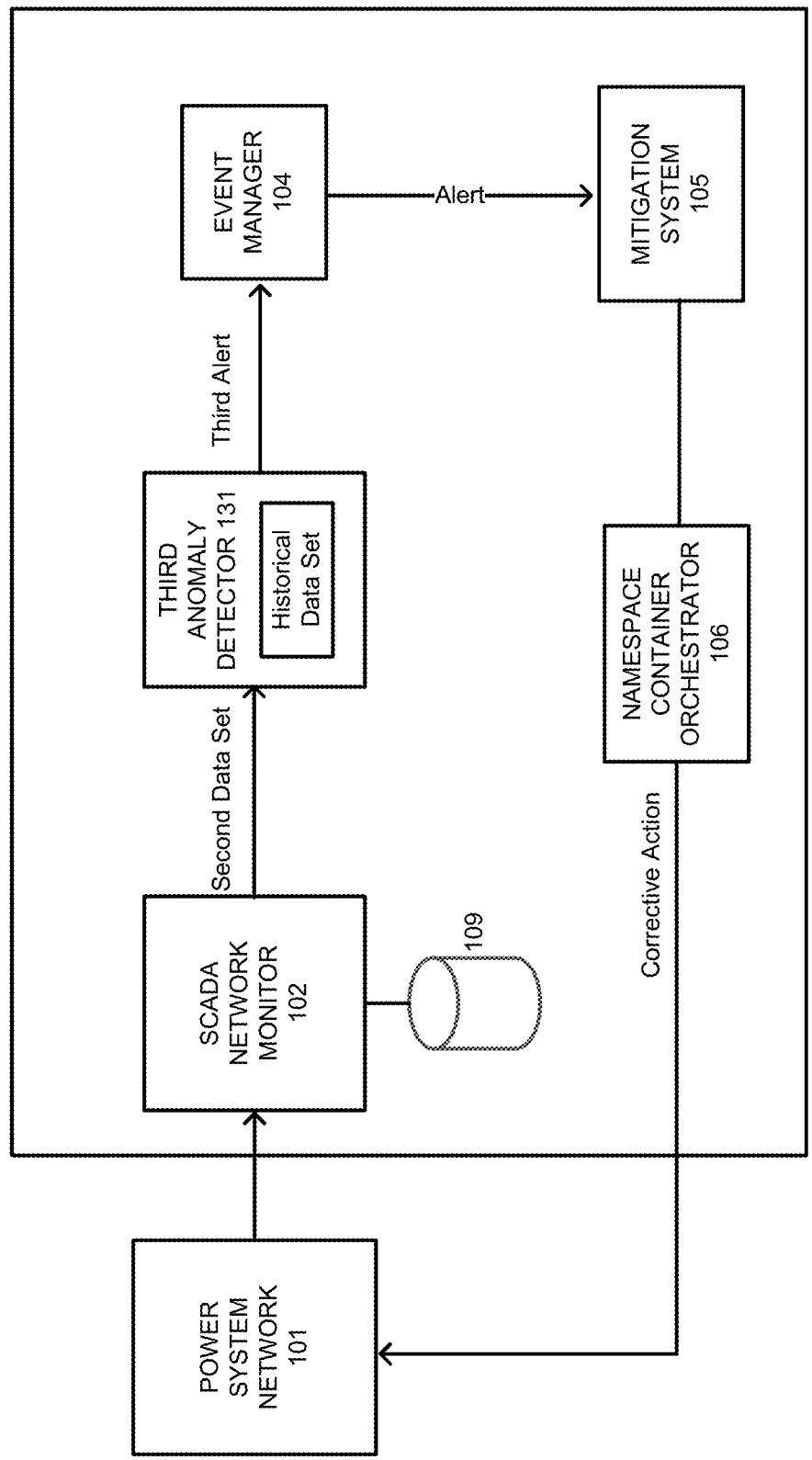
FIG. 2C illustrates a block diagram of a third cyber-security system (e.g., a signature-based intrusion detection system) for a power system network in accordance with embodiments of the present disclosure.

FIG. 2C illustrates an exemplary cyber-security system 100C for a power system network 101, according to some embodiments of the present disclosure. This exemplary cyber-security system 100C includes a SCADA network monitor 102, an event manager 104, a mitigation system 105, a namespace container orchestrator 106, a database 109, and a third anomaly detector 131. In some examples, the third anomaly detector 131 may include a signature-based IDS. Similar to FIGS. 2A and 2B, a namespace container orchestrator 106 may effectively manage virtual image snapshots and create an encapsulated SDN environment. Once an intrusion is detected, the mitigation system 105 may activate a namespace container orchestrator 106 to remove one or more compromised substations (e.g., a PDC) and replace a compromised PDC with new substation PDC.

In some embodiments of the present disclosure, a SCADA network monitor 102 may receive a second data set from a power system network 101. A third anomaly detector 131 may then compare the second data set to a historical data set to identify in the second data set a third anomaly in the power system network 101. For example, in a third anomaly detector 131, filtered SCADA packets may be compared to known attack signatures. In response to identifying a third anomaly, the third anomaly detector 131 may pass a third alert signal corresponding to the third anomaly to an event manager 104. The event manager 104 may then evaluate the third alert signal and when the event manager 104 determines that the third alert signal corresponds to an intrusion and/or an undesirable event, the event manager 104 may then pass the third alert signal to a mitigation system 105. In response to receiving the third alert signal, the mitigation system 105 may perform a third corrective action affecting the power system network 101.

Figure 3:
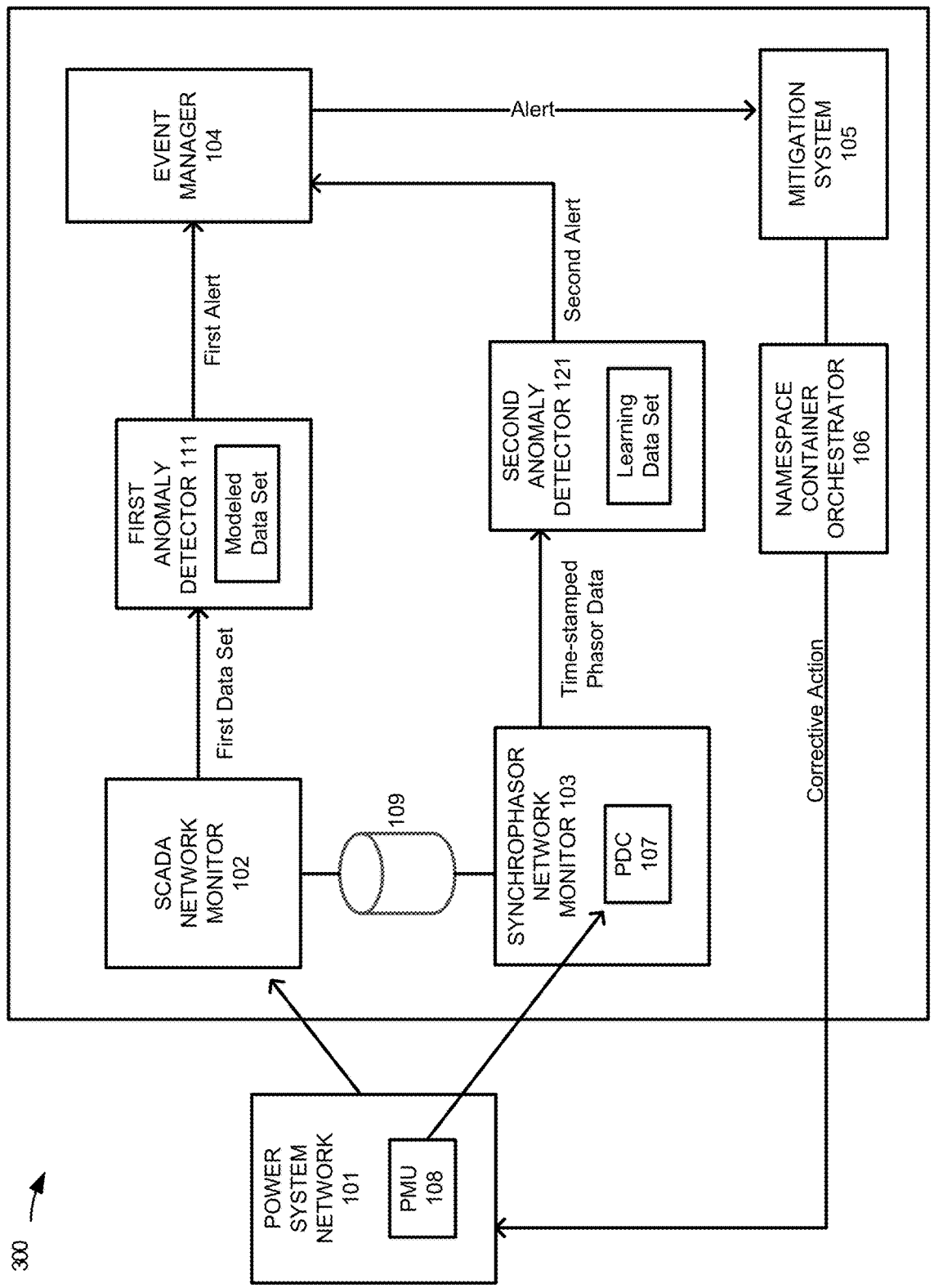
FIG. 3 illustrates a block diagram of an implementation of a hybrid cyber-security system for a power system network in accordance with embodiments of the present disclosure.

FIG. 3 illustrates a block diagram that depicts a cyber-security system 300 for a power system network 101 that implements a hybrid intrusion detection system that incorporates the three anomaly detectors illustrated in FIGS. 2A, 2B, and 2C, according to some embodiments of the present disclosure. In this example, the power system network 101 may funnel at least two data streams via a SCADA network monitor 102 and a synchrophasor network monitor 103 into the cyber-security system 300. In some examples, the first data stream may include network communications (via the SCADA network monitor 102) and/or phasor measurements (via a PMU 108 to a PDC 107 in the synchrophasor network monitor 103). In some embodiments of the present disclosure, with the exception of historical data aggregation and offline learning, all of this processing may be performed in real time. In some embodiments of the present disclosure, the synchrophasor network monitor 103 may include a data aggregator (not shown). A data aggregator may receive all phasor measurements as input and format the phasor measurements for further evaluation. Upon receiving phasor measurements, a data aggregator may forward the formatted data to a database 109, for example a relational database. Additionally, in some embodiments of the present disclosure, a network analyzer/network sniffer may be included (not shown). Among other things, a network analyzer/network sniffer may filter the SCADA packets from the SCADA network monitor 102, identify certain SCADA packets, and/or filters them for further evaluation. In some examples, SCADA packets may be filtered based on a whitelist of at least one of: a MAC address, an IP address, an ethernet port number, a network port number, a transport port number, a SCADA protocol, and/or a SCADA function code.

Thus, as described herein, at least three anomaly detectors, 111, 121, and 131, may be used to detect intrusions in a power system network 101, where different rules are used in each individual anomaly detector to detect anomalies. An example of the rules is illustrated in FIG. 8. Among other things, IDS rules may integrate logical system behavior, protocol-specific knowledge, and/or data-based learning to develop comprehensive solutions for monitoring possible intrusions upon a power system network 100. In the exemplary system of FIG. 3, a network-based IDS, a model-based IDS, machine learning IDS, and synchrophasor data are integrated into the cyber-security system 300 to detect unknown, coordinated, and stealthy cyber-attacks targeting the power system network 101.

Attacks may be classified into two types: Information Technology (IT)-based attacks, and SCADA-based attacks.

IT-Based Attacks: IT-based attacks include a traditional host and network-based attacks including scanning attacks (e.g., ping scanning, nmap scanning), Denial of Service (DoS) attacks, spoofing attacks (e.g., Internet Protocol (IP) spoofing, Address Resolution Protocol (ARP) spoofing), and phishing attacks (e.g., email scam, social engineering, etc.) that can be deployed in the power system network environment to develop a blueprint of the network architecture, compromise devices, and/or affect power system stability.

SCADA-Based Attacks: SCADA-based attacks include those attacks that are defined in the operational technology (OT) environment pertinent to the SCADA power system. These attack vectors target insecure communication protocols, field devices, computers, and several other digital access points that can be exploited to inflict severe damage on the grid infrastructure. In particular, it can be classified into two types: single cyber-attack and coordinated cyber-attack. Single cyber-attacks consist of isolated attacks that can be performed on measurements, control signals, computing systems, and wide-area networks; however, coordinated cyber-attacks are a combination of several attacks that are coordinated in time and space to optimize their impact while remaining mostly undetected by conventional IDS solutions. The recent hack of Ukraine's power grid in 2015 presents real-world example of coordinated attacks that impacted 225,000 customers by shutting down seven 110-kv and twenty-three 35-kv substations for three hours.

Three different attack vectors examples are given below:
1) Malicious tripping attack: This attack vector involves malicious tripping of a physical relay. During the attack, false tripping command packets are injected to disconnect the power system components by tripping a circuit breaker.
2) Pulse attack: This attack vector involves periodically changing an input control signal by adding the pulse attack parameter, $\gamma_{pulse}$, for a small-time interval, (t1). It retains back the original input for a remaining interval, (T–t1), for the given time period, (T), as shown in Equation 1.
3) Ramp attack: This attack vector involves adding a time varying ramp signal to the input control signal based on a ramp signal parameter, $\gamma_{ramp}$, as shown in Equation 2.

$$P_{pulse} = \begin{cases} P_i(1+\lambda_{pulse})(t=t_1) \\ P_i(t=T-t_1) \end{cases} \quad (1)$$

$$P_{ramp} = P_i + \lambda_{ramp} * t \quad (2)$$

Figure 4:
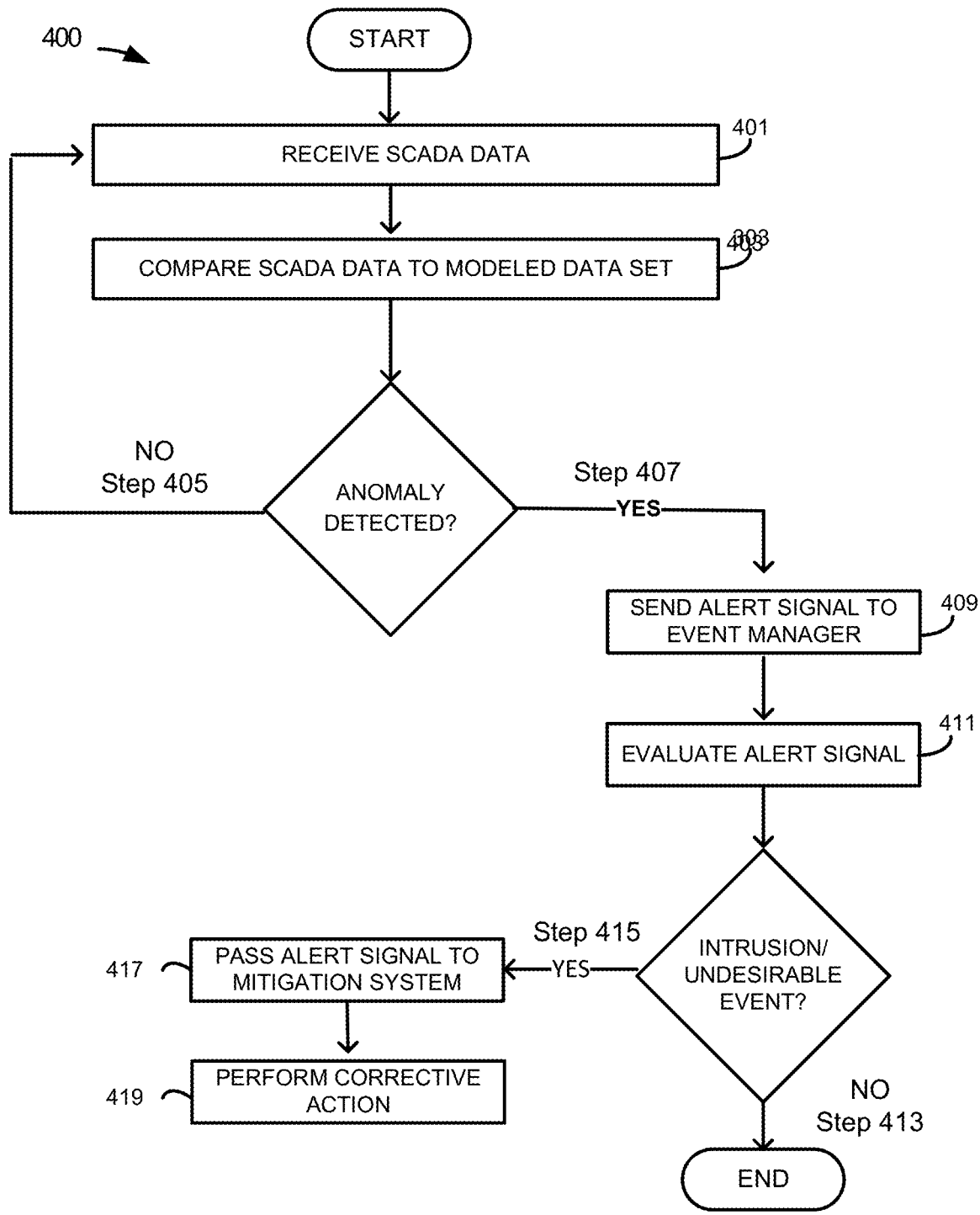
FIG. 4 illustrates a flow diagram of a first process performed by a first cyber-security system for a power system network in accordance with embodiments of the present disclosure.
Figure 5:
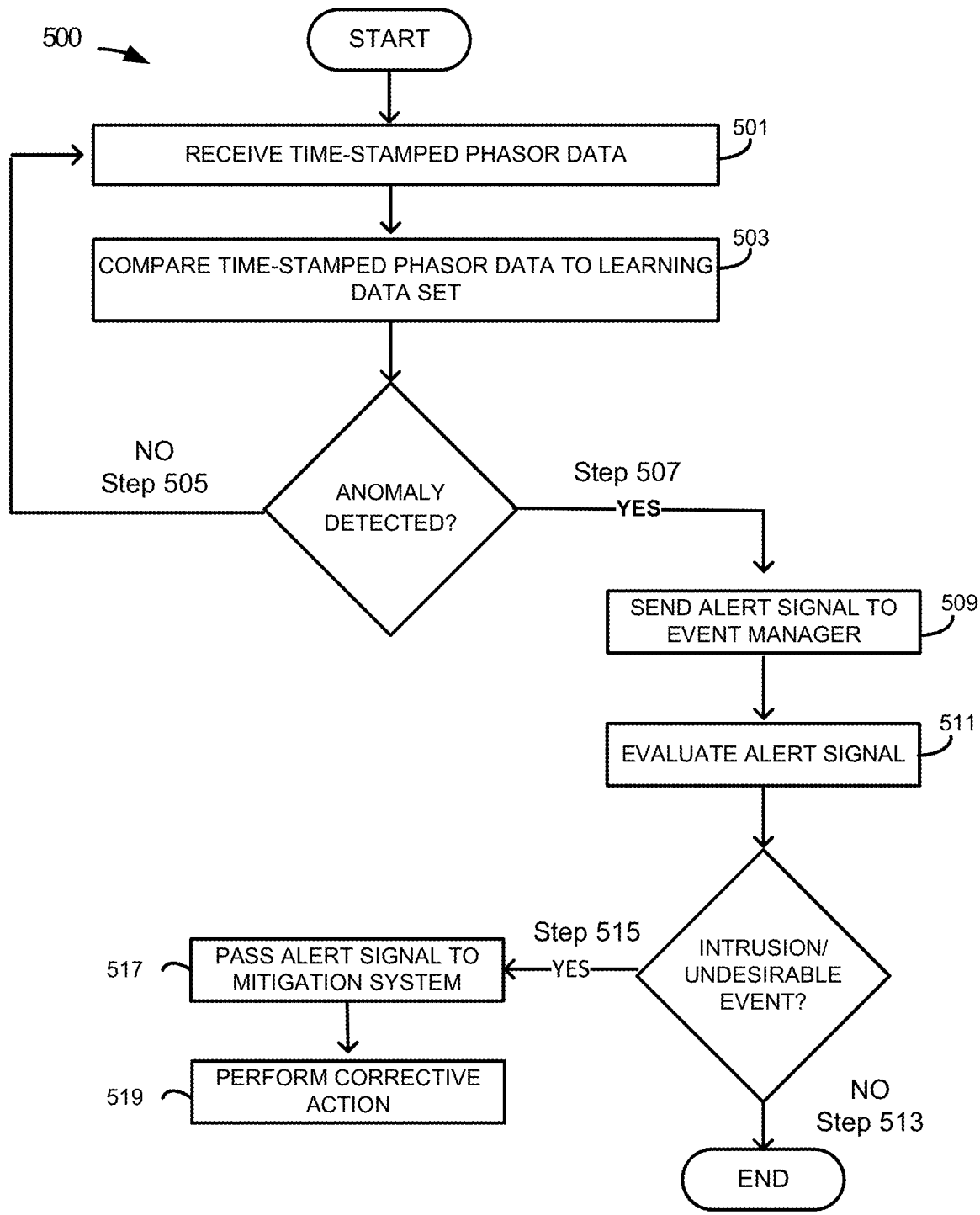
FIG. 5 illustrates a flow diagram of a second process performed by a second cyber-security system for a power system network in accordance with embodiments of the present disclosure.
Figure 6:
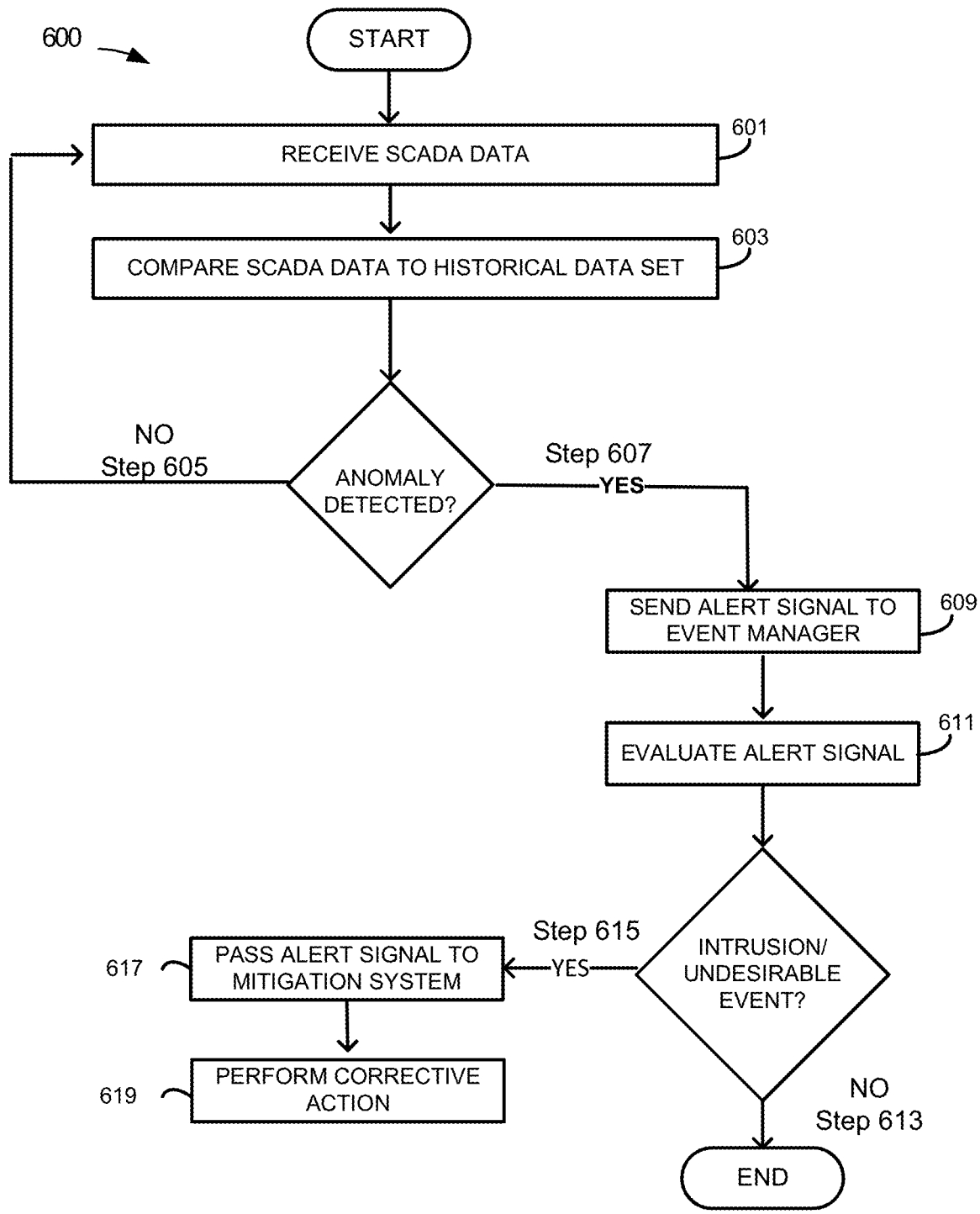
FIG. 6 illustrates a flow diagram of a third process performed by a third cyber-security system for a power system network in accordance with embodiments of the present disclosure.

With reference now to FIGS. 4-6, additional details of processes for cyber-security systems utilizing at least one of a first anomaly detector 111, a second anomaly detector 121, and/or a third anomaly detector 131 will be described, according to some embodiments of the present disclosure.

The operation of a process 400 is referenced parenthetically in the paragraphs that follow, along with references to the elements and systems from the exemplary cyber-security system 100 illustrated in FIG. 1, cyber-security systems 100A-C illustrated in FIGS. 2A-2C, and/or a cyber-security system 300 illustrated in FIG. 3 and described above. While a general order for the steps of the process 400 is shown in FIG. 4, the process 400 can include more or fewer steps or can arrange the order of the steps differently than those shown in FIG. 4. In some embodiments of the present disclosure, a process 400 may be implemented utilizing at least one anomaly detector, for example at least one of a first anomaly detector 111, a second anomaly detector 121, and/or a third anomaly detector 131.

Referring to FIG. 4, this exemplary process 400 may start by receiving SCADA data (step 401). For example, a SCADA network monitor 102 may receive a first data set (e.g., SCADA packets) from a power system network 101. A first anomaly detector 111 may then compare the first data set to a modeled data set to identify if the first data set includes a first anomaly (step 403). For example, a modeled data set may include at least one of timing data, frequency date, and/or range data. If an anomaly is not detected NO (step 405), a SCADA network monitor 102 may continue to receive SCADA packets from the power system network 101.

Referring again to FIG. 4, in response to identifying an anomaly YES (step 407), a first anomaly detector 111 may pass an alert signal corresponding to the first anomaly to an event manager 104 (step 409). The event manager 104 may then evaluate the first alert signal (step 411) and when the event manager 104 determines that the first alert signal corresponds to an intrusion and/or an undesirable event YES (step 415), the event manager 104 may then pass the first alert signal to a mitigation system 105 (step 417). In response to receiving the first alert signal, the mitigation system 105 may perform a corrective action affecting the power system network 101 (step 419). For example, a first anomaly detector 111 may check packet latency, and when the packet latency is below a threshold value of a modeled data set, an anomaly may be considered to correspond to an intrusion and/or an undesirable event. In yet another example, a first anomaly detector 111 may verify a packet size of each SCADA packet, and an anomaly may be considered to correspond to an intrusion and/or an undesirable event when the packet size exceeds a threshold value of a modeled data set.

With reference now to FIG. 5, additional details of a process 500 for a machine learning IDS will be described, according to some embodiments of the present disclosure. A machine learning IDS applies machine learning algorithms, such as decision tree (DT), to learn the behavior of different cyber-physical events, such as line faults, cyberattacks, and normal events to detect different classes of anomalies in a power system network. In some embodiments of the present disclosure, a process 500 like that shown in FIG. 5 may be implemented in a second anomaly detector 121, as described above.

The processes of operation 500 are referenced parenthetically in the paragraphs that follow, along with references to the elements and systems from a cyber-security system 100 illustrated in FIG. 1, cyber-security systems 100A-C illustrated in FIGS. 2A-2C, and/or a cyber-security system 300 illustrated in FIG. 3 and described above. While a general order for the steps of the process 500 is shown in FIG. 5, the process 500 can include more or fewer steps or can arrange the order of the steps differently than those shown in FIG. 5.

Referring again to FIG. 5, this exemplary process 500 may start with a synchrophasor network monitor 102 receiving time-stamped phasor data from a power system network 101 (step 501). In some examples, time-stamped phasor data may be received via a PMU 108 connected to a PDC 107. A second anomaly detector 121 may compare the time-stamped phasor data to a learning data set to identify if there is a second anomaly present in the time-stamped phasor data (step 503). If there no anomaly NO is identified (step 505), the synchrophasor network monitor may continue to receive the time-stamped phasor data from the power system network 101. If an anomaly is detected YES (step 507), the second anomaly detector 121 may pass a second alert signal corresponding to the second anomaly to an event manager 104 (step 509). The event manager 104 may then evaluate the second alert signal (step 511), and when the event manager 104 determines that the second alert signal corresponds to an intrusion and/or an undesirable event YES (step 515), the event manager 104 may pass the second alert signal to a mitigation system 105 (step 517). In response to receiving the second alert signal, the mitigation system 105 may perform a second corrective action affecting the power system network 101 (step 519). In some embodiments, a second anomaly detector 121 may receive alert logs from a first anomaly detector (e.g., model-based IDS) as input to further enhance the detection of different types of events using a decision tree algorithm.

With reference now to FIG. 6, additional details of a process 600 utilizing a third anomaly detector 131 (e.g., signature-based IDS) will be described, according to some embodiments of the present disclosure. The process 600 may be implemented in a cyber-security system for a power system network, according to some embodiments of the present disclosure.

The processes of operation 600 are referenced parenthetically in the paragraphs that follow, along with references to the elements and systems from a cyber-security system 100 illustrated in FIG. 1, cyber-security systems 100A-C illustrated in FIGS. 2A-2C, and/or a cyber-security system 300 illustrated in FIG. 3 and described above. While a general order for the steps of the process 600 is shown in FIG. 6, the process 600 can include more or fewer steps or can arrange the order of the steps differently than those shown in FIG. 6.

Referring again to FIG. 6, this exemplary process 600 may begin with a SCADA network monitor 102 receiving SCADA data (e.g., a second data set) from a power system network 101 (step 601). A third anomaly detector 131 may compare the second data set to a historical data set to identify if there is a third anomaly present in the second data set (step 603). For example, in a third anomaly detector 131, filtered SCADA packets may be compared to known attack signatures. If no anomaly is detected NO (step 605), the SCADA network monitor 102 may continue to receive SCADA data. In response to identifying a third anomaly YES (step 607), the third anomaly detector 131 may pass a third alert signal corresponding to the third anomaly to an event manager 104 (step 609). The event manager 104 may then evaluate the third alert signal (step 611). When the event manager 104 determines that the third alert signal corresponds to an intrusion and/or an undesirable event, the event manager 104 may pass the third alert signal to a mitigation system 105 (step 617). In response to receiving the third alert signal, the mitigation system 105 may perform a third corrective action affecting the power system network 101 (step 619).

Figure 7A:
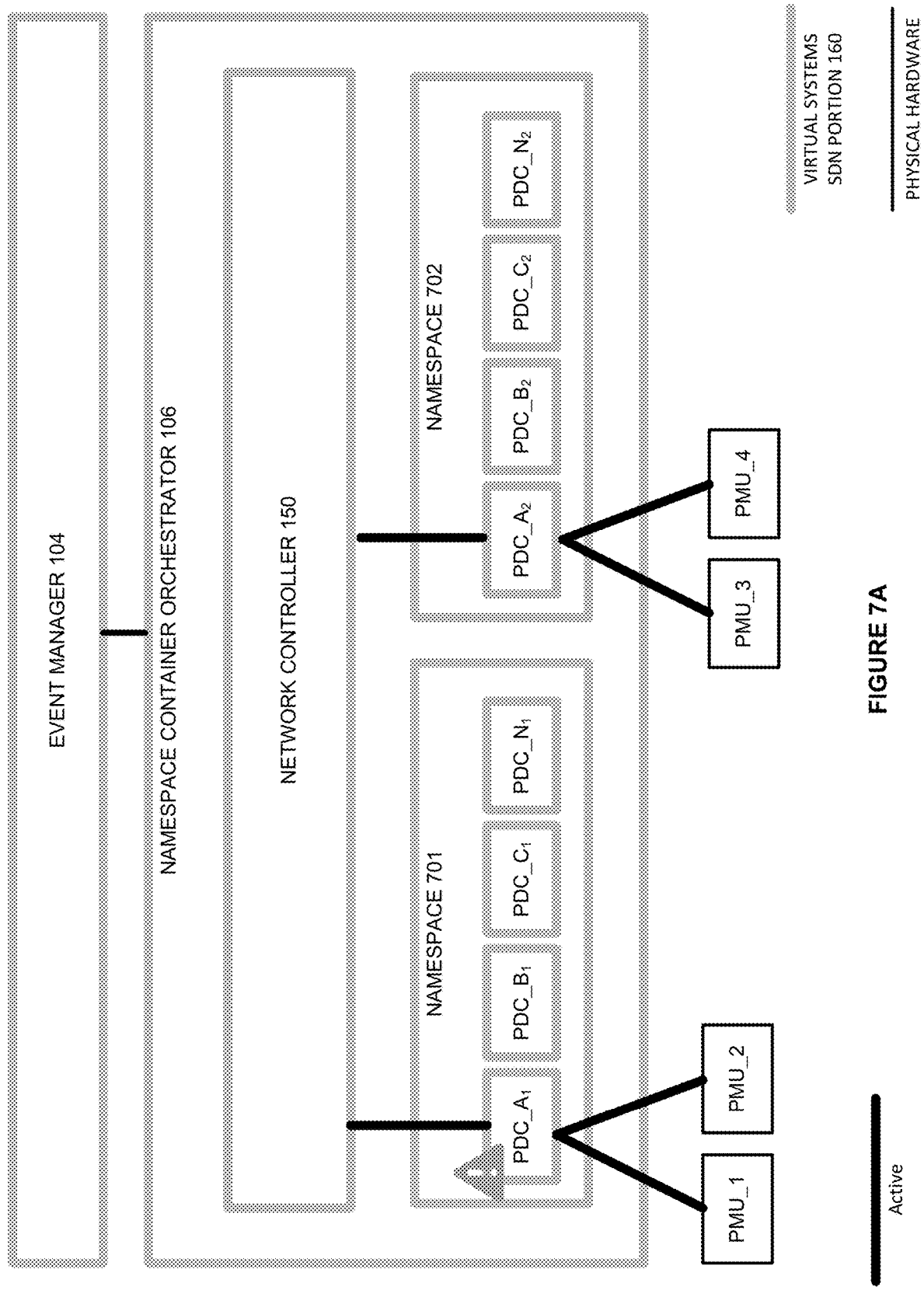
FIGS. 7A-7C are block diagrams illustrating implementation of a namespace container orchestrator for a mitigation system in accordance with embodiments of the present disclosure.
Figure 7B:
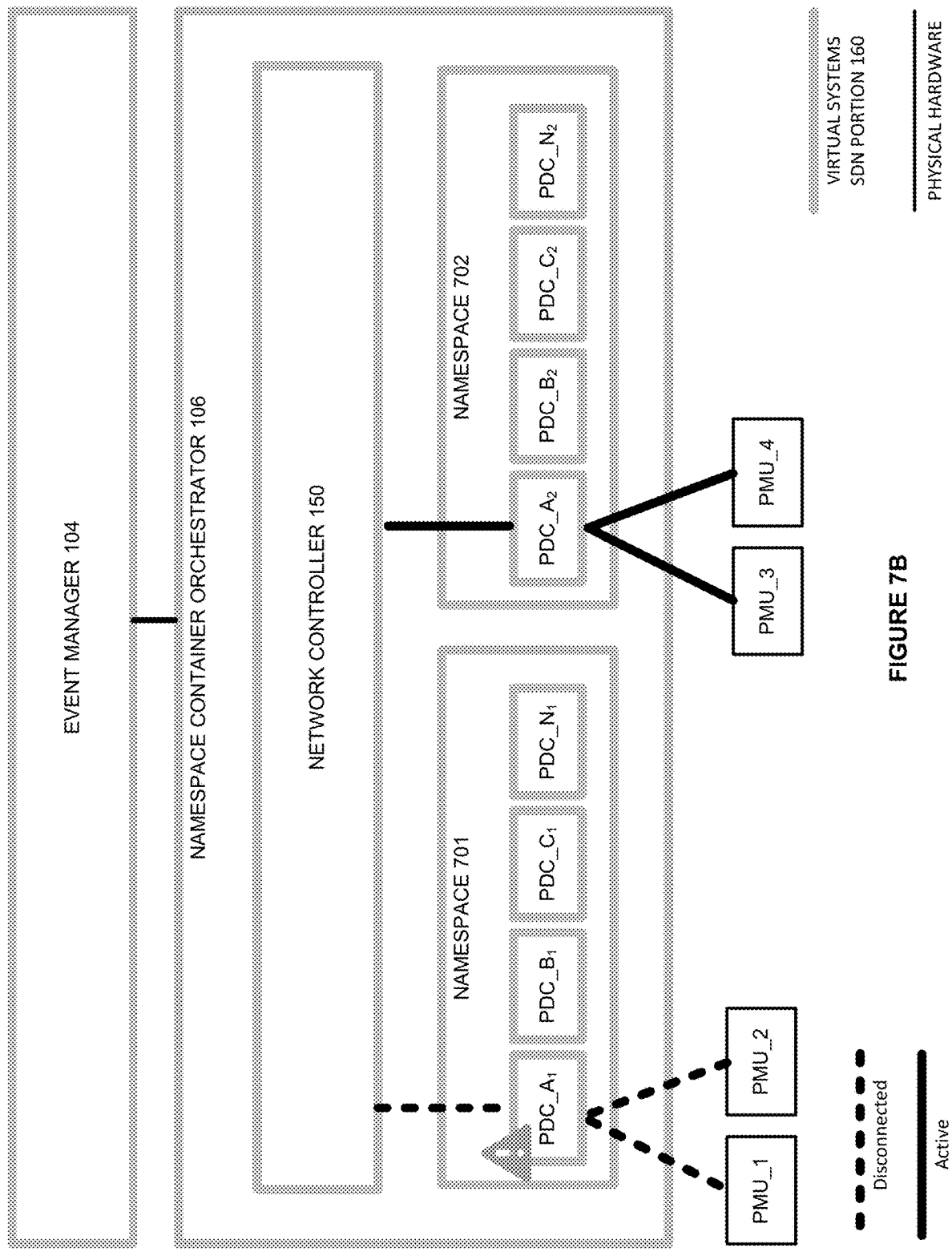
Figure 7C:
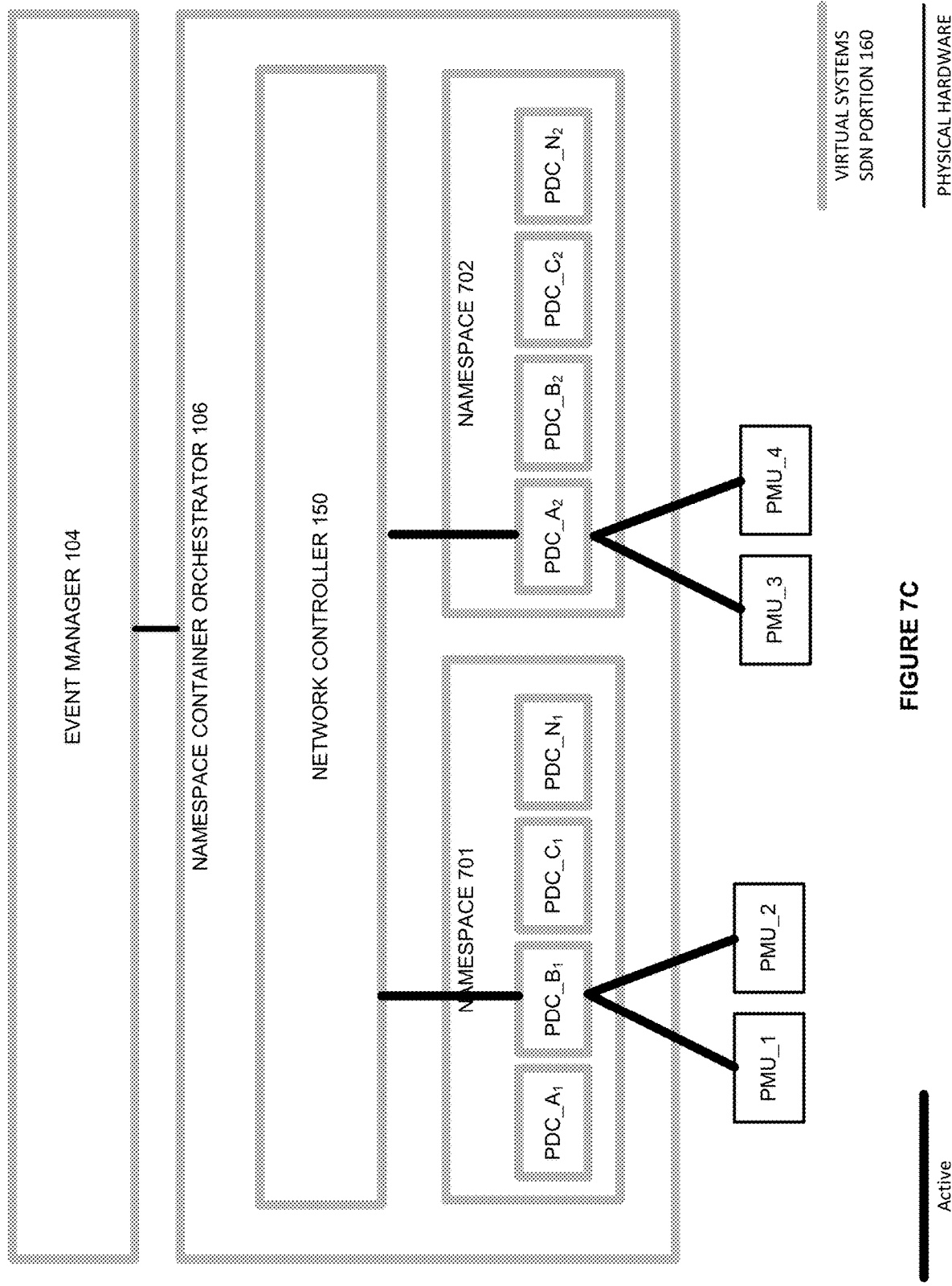

FIGS. 7A-7C depict exemplary namespace container orchestrators 106 performing substation-based local PDC namespace orchestration as needed to configure several virtual local PDCs (e.g., PDC_A$_1$-N$_1$ and PDC_A$_2$-N$_2$) based on the system topology. The configured virtual local PDC_A$_1$-N$_1$ and PDC_A$_2$-N$_2$ receive PMU measurements from PMUs 108 and forward the PMU measurements to a PDC 107. In this example, PDC-A$_1$ receives PMU measurements from PMU-1 and PMU-2. PDC-A$_2$ receives PMU measurements from PMU-3 and PMU-4. PDC-1b-Nb are initialized but not connected to the physical system network 101. A network controller 150 also receives alert messages and new network addresses to initiate the connection with new substations PDC to restore the connection. Namespace 701 includes PDC_A$_1$-N$_1$ and Namespace 702 includes PDC_A$_2$-N$_2$. PDC_A$_1$ is connected to PMU_1 and PMU_2. Similarly, PDC_A$_2$ is connected to PMU_3 and PMU_4.

For example, a mitigation system 105 may activate a namespace container orchestrator 106 to remove a compromised PDC_A$_1$ (illustrated with the  icon) and replace it with a new substation PDC_B$_1$. A network controller 150 may also receive alert messages and new network addresses to initiate the connection with a new substation PDC to restore the connection. As illustrated in FIG. 7B, PDC_A$_1$ is isolated from the rest of the system. FIG. 7C illustrates, PDC_B$_1$ replacing PDC_A$_1$. An attacker may be targeting the Local Area Network (LAN) that connects PDC_A$_1$ to PMU-1 and PMU-2.

FIG. 8 illustrates an IDS Rules for illustrative purpose, where the IDS Rules include at least two rules (Rule_1 and Rule_2), but IDS Rules may include more or fewer rules. Furthermore, other formats for IDS rules are possible and are in accordance with the embodiments described herein. The IDS Rules summarized in FIG. 8 include the fields/columns "Rule Name," "Attack Type," and "IDS Rule." The columns listed are for illustrative purposes only, and not all columns are required. Additionally, IDS Rules may include other columns not listed in this example.

Referring again to FIG. 8, the "Rule Name" field may list a name and/or other unique identifier for each rule in IDS Rules Table 800. The "Attack Type" field may identify the type of attack (e.g., Denial of Service DoS, ARP Spoofing, etc.). The "IDS Rule" field defines the rule. In some examples, a rule may be defined by various parameters and associated thresholds. Additionally, or alternatively, the rule may be in script format, or the script that is run by the associated anomaly detected. Exemplary Rule_1 accounts for DoS related attacks where packet size and/or latency surpasses an acceptable threshold; Rule_2 identifies ARP spoofing (MITM) attack based on whitelisting MAC addresses, IP addresses, and port numbers in the Ethernet, network, and transport layers.

Figure 9:
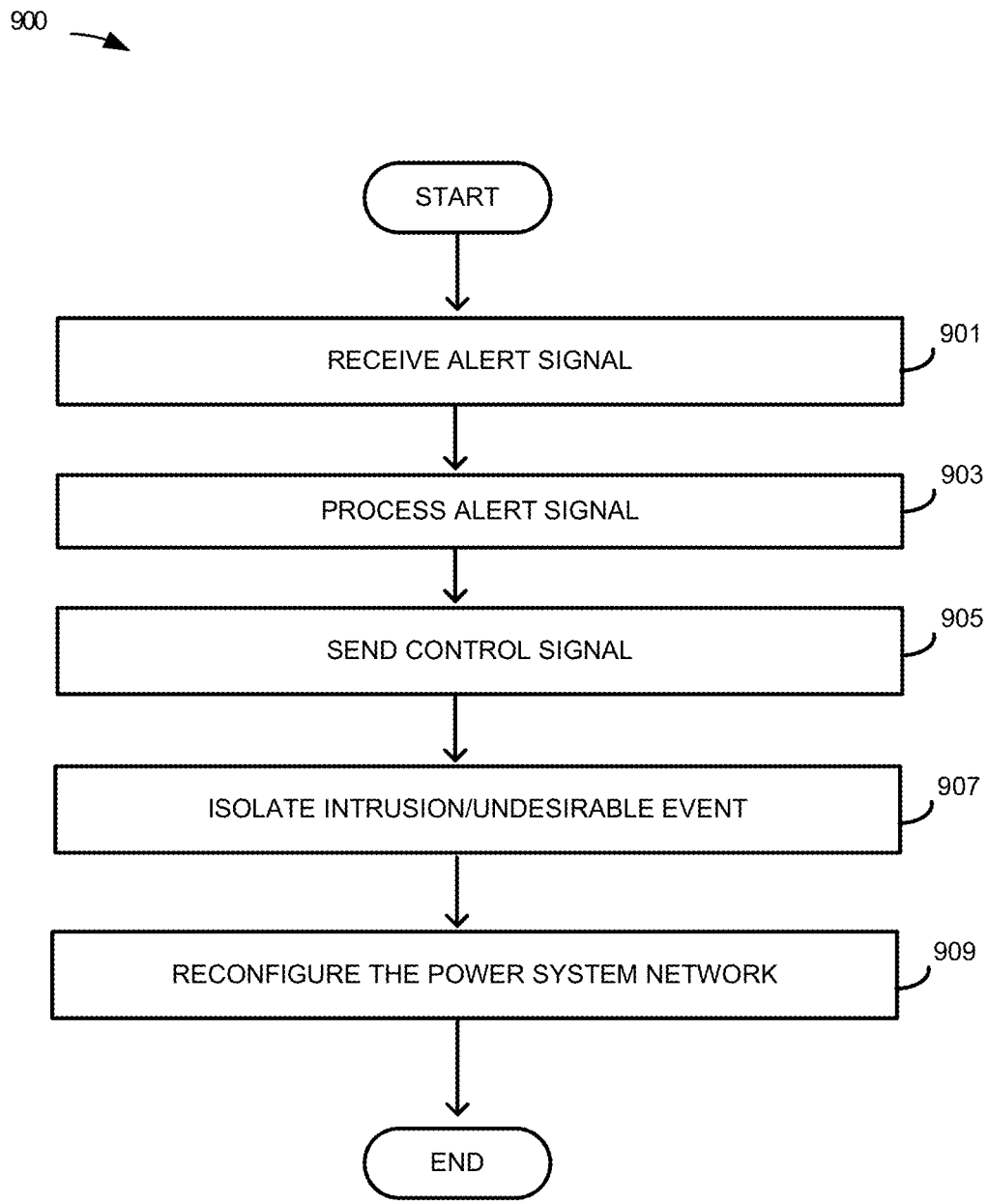
FIG. 9 illustrates a flow diagram of a mitigation process performed by a mitigation system in accordance with embodiments of the present disclosure.

With reference now to FIG. 9, additional details are shown of a process 900 for a cyber-security system for a power system network, according to some embodiments of the present disclosure. This exemplary process 900 may be implement into a cyber-security system for a power system network. For example, when an anomaly is detected, the resultant generated alert may be delivered to a mitigation system 105 through an event manager 104 to take corrective actions. The corrective actions may include, among other things, reconfiguring a power system network to isolate a compromised phasor data concentrators (PDCs), orchestrating new PDCs to prevent the propagation of attacks, and/or reconnecting disconnected PMUs to restore the system's observability.

The processes of operation 900 are referenced parenthetically in the paragraphs that follow, along with references to the elements and systems from a cyber-security system 100 illustrated in FIG. 1, cyber-security systems 100A-C illustrated in FIGS. 2A-2C, a cyber-security system 300 illustrated in FIG. 3, and/or a namespace container orchestrator 106 illustrated in FIGS. 7A-7C and as described above. While a general order for the steps of the process 900 is shown in FIG. 9, the process 900 can include more or fewer steps or can arrange the order of the steps differently than those shown in FIG. 9. The process 900 may be implemented into a mitigation system 105.

The exemplary process 900 may begin with a mitigation system 105 receiving, from an event manager 104, an alert signal corresponding to an intrusion and/or an undesirable event (step 901). The mitigation system 105 may process the alert signal (step 903) and send a control signal to a namespace container orchestrator 106 (step 905). The namespace container orchestrator 106 may then isolate the intrusion and/or the undesirable event (step 907). The mitigation system 109 may then reconfigure the power system network 101 (step 909).

In some embodiments of the present disclosure, a network controller 150 may manage a software defined network portion 160 of a power system network 101. A namespace container orchestrator 106 may then, in response to a control signal, modify a network configuration of an element in the software defined network portion 160 of the power system network 101 and direct the new network configuration of the element of the software defined network portion 160 of the power system network 101 to the network controller 150.

Figure 10:
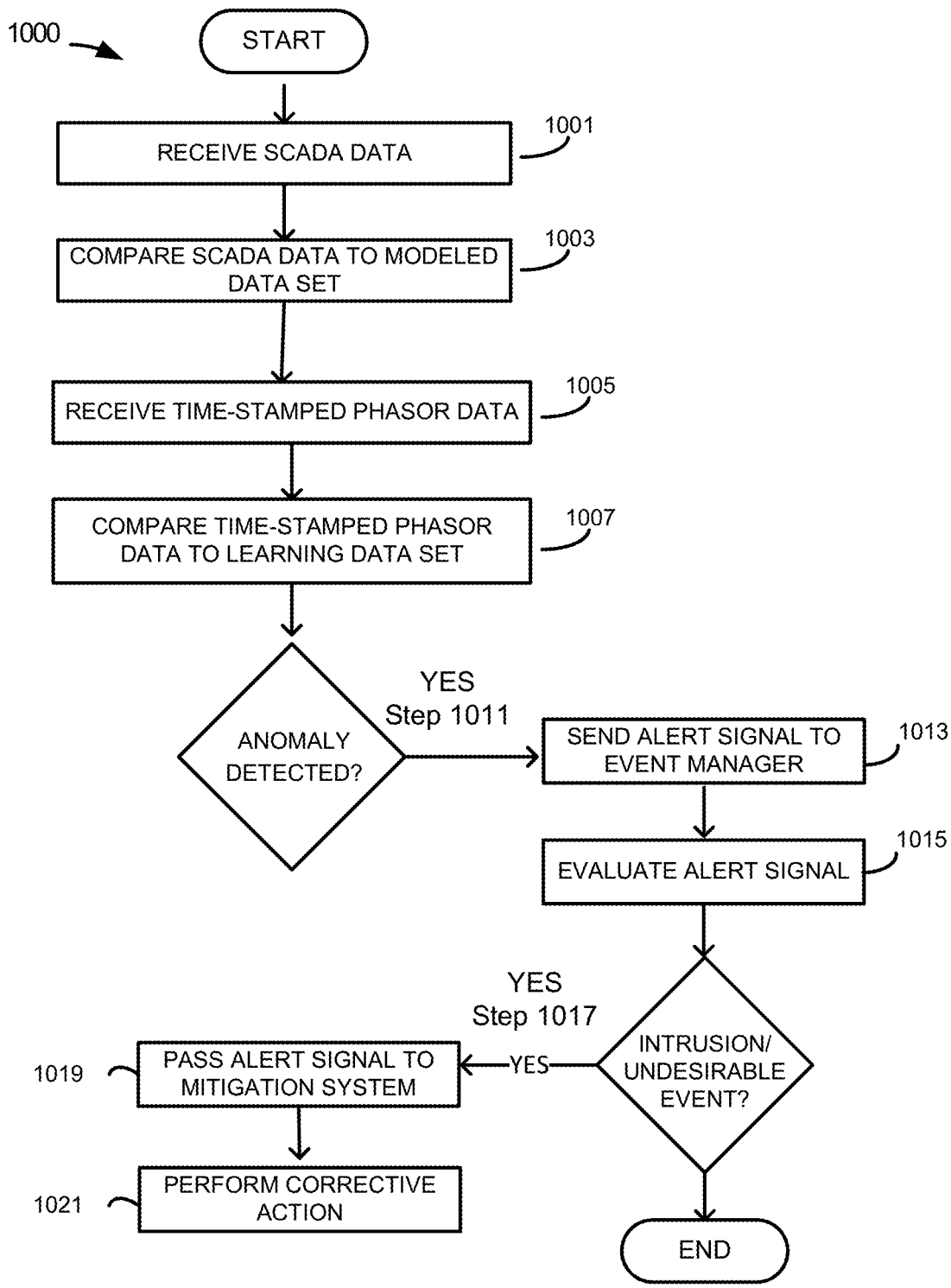
FIG. 10 illustrates a flow diagram of a hybrid cyber-security process in accordance with embodiments of the present disclosure.

Referring now to FIG. 10, additional details are shown of a process 1000 for a cyber-security system for a power system network. This exemplary process 1000 may include a mitigation system 105. For example, once an anomaly is detected, the generated alert may be delivered to the mitigation system 105 through event manager 104 publisher-subscriber interfaces to take corrective actions. The corrective actions include reconfiguring a power system network to isolate the compromised phasor data concentrators (PDCs), orchestrating new PDCs to prevent the propagation of attacks, and/or reconnecting the disconnected PMUs to restore the system's observability.

The processes of the process 1000 are referenced parenthetically in the paragraphs that follow, along with references to the elements and systems from the systems 100 illustrated in FIG. 1, FIGS. 2A-2C, FIG. 3, and/or FIGS. 7A-7C. While a general order for the steps of the process 1000 is shown in FIG. 10, the process 1000 can include more or fewer steps or can arrange the order of the steps differently than those shown in FIG. 10. The exemplary process 1000 shown in FIG. 10 may be implemented into a cyber-security system for a power system network.

Referring to FIG. 10, this exemplary process 1000 may start by receiving SCADA data (step 1001) from a power system network 101. For example, a SCADA network monitor 102 may receive a first data set (e.g., SCADA packets) from the power system network 101. A first anomaly detector 111 may compare the first data set to a modeled data set to identify if the first data set includes a first anomaly (step 1003). For example, a modeled data set may include at least one of timing data, frequency data, and/or range data. Next, a synchrophasor network monitor 103 may receive time-stamped phasor data from the power system network 101 (step 1005). In some examples, time-stamped phasor data may be received via a PMU 108 connected to a PDC 107. A second anomaly detector 121 may compare the time-stamped phasor data to a learning data set to identify if there is a second anomaly present in the time-stamped phasor data (step 1007). In response to identifying the anomaly YES (step 1011), the first anomaly detector 111/ second anomaly detector 121 may pass an alert signal corresponding to the first/second anomaly to an event manager 104 (step 1013). For example, both the first anomaly detector and the second anomaly detector may detect an anomaly, and both pass an alert signal corresponding to the anomaly to an event manager 104. Alternatively, one of the first or second anomaly detectors may detect the anomaly and pass the alert signal to the event manager 104. In some embodiments, a first anomaly detector 111 may detect a first anomaly, while a second anomaly detector 121 may detect a second anomaly that is different than the first anomaly.

In some embodiments of the present disclosure, an event manager 104 may evaluate a first alert signal (step 1015) and when the event manager 104 determines that the first alert signal corresponds to an intrusion and/or an undesirable event YES (step 1017), the event manager 104 may pass the alert signal to a mitigation system 105 (step 1019) (e.g., one or both of the first and/or second alert signals). In response to receiving an alert signal, the mitigation system 105 may perform a corrective action affecting the power system network 101 (step 1021). For example, a first anomaly detector 111 may check packet latency, and when the packet latency is below a threshold value of a modeled data set, an anomaly corresponding to an intrusion and/or undesirable event may be considered to be detected. In yet another example, a first anomaly detector 111 may verify a packet size of each SCADA packet, and an anomaly corresponding to an intrusion and/or undesirable event may be considered to be detected when the packet size exceeds a threshold value of the modeled data set.

As described herein, a visualization server 170 may provide real-time visualization of large-scale environments involving cyber-physical devices. In some embodiments of the present disclosure, a visualization server 170 may integrate real, physical hardware along with emulated devices communicating with each other as part of the same system. A visualization server 170 may also be capable of streaming, collecting, storing, transporting, and/or visualizing all data within an emulated environment, and/or any data that passes through the emulated environment. This capability, among other things, enables high fidelity visual analysis of events to be performed in real time as well as the use of historical data for forensic analysis.

One of the most challenging problems in cyber-security is making sense of the immense wealth of data captured and knowing where to begin looking for abnormalities or areas for improvement and optimization. During only a few minutes of operation, a system can generate gigabytes of system logs, packet captures, and power values for a system with approximately 100 devices. This means that after the data have been captured, it should then be aggregated, compared with the results of any leveraged Intrusion Detection Systems (IDS) against available system logs, and cross-referenced with the logged power values at any given time stamp.

Considering the amount of data, this process, even for relatively a short run time, can take days of concerted effort to produce readable results. Metaphorically, this would be similar to trying to determine which team won a football game by only analyzing the physical and mathematical datapoints throughout the match; the vectors of each player, arc of each kicked ball, etc. It would take weeks to understand what a single, well-placed camera could accomplish in real-time. The ability to combine currently available system and network virtualization, power simulation, real-time data streaming, and power hardware-in-the-loop technologies, to enable the building of a comprehensive real-time visualization is a desirable capability for many organizations, especially those related to research and education.

In some embodiments of the present disclosure, a visualization server 170 may provide an interface through a single web interface, which can provide a user 180 with a vantage from which to observe at least one of a power system network, a communication system, quickly highlight the anomalies and attacks, and/or allow a user (or users) 180 to interact with the system for in-depth analysis. As a result, among other things, a user 180, within an interface to the visualization server 170, may quickly set up an environment, from small-scaled microgrids with a few subnets up to city-size grids with thousands of networks, either on local hardware and/or remotely on a server.

Specifically, in the field of networking and information security, there is significant advantage in having a way to visually analyze different events as they impact different cyber-physical layers in parallel to the network. Thus, in some embodiments of the present disclosure, a visualization server 170 may provide a platform for a user (or users) 180 to build virtual worlds incorporating multiple different cyber-physical systems and interact with an emulated network in real time. Users (e.g., user 180) may then interact with this system to initiate and observe events, as well as extreme system states without having to necessarily compromise and risk damage to real hardware. A user (or users) 180 has the option to link in any real devices to an emulated network to add them into the environment. This allows a user (or users) 180 to evaluate physical hardware in many different scenarios without necessarily requiring build out of large physical testbeds.

In some embodiments of the present disclosure, a visualization server 170 may enable real-time visualization of at least one of network traffic, security alerts, and/or power system states and allows for historical data sets of network flow, packet capture, system logs, and power system state to be queried for analysis. A visualization server 170 can enable the logical visualization of a power system network (e.g., power system network 101), including a multitude of electric devices, and a communications network with a full diversity of networked components. Additionally, a visualization server 170 may include the geographic context for reference, pathways toward resilience, and finally, potential financial impacts.

This wide variety of data sets can present technical difficulties, namely, how to ensure everything remains clear and understandable to a user (or users) 180. Too many elements on the screen at once can become a visually distracting and fail to convey useful information. Too few elements can cause the view to become too abstract to be usable. Each element should communicate clearly what it represents with as little superfluous data possible. A solution to this problem can be to focus narrowly on one data set and ensure that correlated elements are easy to identify; power system and/or communication network elements are distinct from each other and the underlying geography, etc. Then, once satisfied with an isolated view, the views may be overlaid, and each layer is ensured to be distinct and not confuse the overall visual. If a view cannot be included in the combined context and/or if the data set does not appear to have a clear relationship to X and Y coordinates, this instance may be branched off as a distinct 3-D render.

The dynamic and multivariate nature of this real-time visualization can require a 3-D engine and framework capable of replication and binding seamlessly to ReactJS (a Java-Script library for building user interfaces), which can compose the user interface. Because visualization can be built on web browsers and where no such engine exists, a unique engine may be constructed for a visualization server 170 referencing extant engines like Unity and Unreal (libraries specific to 3D visualization), for organizational structure. For example, ThreeJS (another library specific to 3D visualization) can provide a direct way to import and manufacture 3-D objects, allowing the development to focus on elements unique to the platform. This exemplary visualization server 170 permits as many 3-D instances to be built and separated from the main context as necessary while adhering to a strict set of guidelines. Due to the dynamic nature of a visualization server 170 a formal way to place each element on load or edit is important and an isometric grid, like those in real-time-strategy games, offers a utilitarian structure for all elements to adhere to and speak a common placement language. Instance-rendering was leveraged to allow this grid to support any size of experiment (explored further below). Each tile in this 2-D array was passed as a reference to any item located atop it.

For instance, each power object may sit atop a tile on the grid, given X and Y coordinates, and its platform may scale to its maximum power consumption or production to communicate relative sizes in the grid. Once an object is placed, other co-related elements may be passed its location on the grid as a reference with the residential network. The most difficult layer to conceptualize may be the network, because it does not neatly align with a coordinate system. Often, networking equipment can be located quite literally on top of each other, making this a somewhat confusing visual to conceive. A solution implemented was to build a relational network first, without placing it on to the underlying grid. There were several observations of useful properties of networking that enabled an easy-to-understand visual to be built. Each node on a network is part of a subnet—for instance 192.168.0.1 is a part of the network 192.168.0.0/24—so by passing the range (24) and identity (192.168.0.0) to the visualization platform, the network can be divided into smaller subnets. Each subnet has a power partner assigned, which it hovers above, whereas unassigned subnets are located by default in the outside Internet, hovering in the center of the grid. Assigned and unassigned subnets divide the network into two distinct network divisions: the experiment network and outside Internet.

To build this structure, in some embodiments of the present disclosure, each node was placed uniformly on a larger sphere by building a Fibonacci spiral along one polar coordinate and passing each coordinate to a network node. By extending this pattern, other network elements can be bound together, such as subnets to reference entire networks (the Internet) or reference networks to their respective parent. Interestingly, after constructing this relationship, similarities between an electric power grid and a communication network emerged by comparing their respective parent-to-child relationships.

In visualizing a power system network 101, all objects contained within a power system network 101 may be connected with angled lines, which when active, can change, for example, from a grey, transparent color to a fully opaque turquoise and show a moving electron. Although using red to indicate an energized might seem like the obvious choice, this was decided against because other elements in the application use red to indicate a warning state. This is only superficially different from network connections, which contain an animation of a moving packet jumping from its source straight to its destination, changing arc height and color if an intrusion detection system (IDS) detects abnormal behavior. Of course, these specifics are provided for illustrative purposes only.

This exemplary connection pathway permits, among other things, different visual effects to be applied over it to communicate different aspects of the connection behavior over time. From OpenDSS, a set of dynamic power properties is received for each line—its directionality, voltage, real power, phase, etc. Using data, it is possible to build a library of visuals that mirror these properties and alter the behavior of a power line—for instance, wavelike behavior propagating down the line could show wavelength and frequency. Each visual alteration can easily be swapped out during run time without affecting the pathway itself. This ability to visualize different properties of connections will help users understand how different network security postures can affect different aspects of the grid.

One method used to optimize performance in some embodiments of the present disclosure, is instance-rendering, a process that uses a single 3-D mesh or texture as a 'flyweight' to leverage replicating large numbers of objects onto a screen at a reduced cost. This method was used in several places throughout the exemplary visualization system described herein, notably on an isometric grid. The entirety of the tiles were, in fact, only one tile instance, which was rendered at different X and Y coordinates and which were passed to the other objects as reference locations. This was a good solution for the isometric grid, where most tiles are static, but this technique may be less than ideal for interactive elements. To interact with the grid (i.e. power system network 101), a kind of "hat-trick" may be performed: if the user hovers over one of the tile instances, on the next render, that instance may be subtracted from the grid and replaced with a real, interactive tile model at the same location.

In some embodiments of the present disclosure, another performance optimization implemented was reducing how often a new model is re-rendered. This approach can make a significant improvement in network communications. During network stress tests, the application performance would significantly slow. This may have been caused by network updates that were being generated at around 30 times the average rate; however, the number of packets drawn on the visual did not increase by the same factor. These packets were being redrawn in the exact location, directly on top of each other, visually indistinct from a single packet. Adding a minimum delta for redraws increased performance on average by more than 20 frames per second.

Another consideration is ensuring that a visualization server 170 and web clients are in sync with an emulation platform. Each client (3-D application) may receive all data sets at a constant interval. This may be useful if the latency between the emulator and the application is nearly nonexistent and the data sent is useful and manageable.

A communications pathway, from the emulation platform to a web client may be as follows: 1. OpenDSS solves next series of data; 2. OpenDSS provider publishes data to the communications broker; 3. Updates are serialized as protocol buffer objects and published; 4. Event manager, subscribed to broker, receives power values; 5. Event manager stores updates in Elasticsearch with time stamps; 6. Event manager fills a buffer with updates; 7. Event manager sends filled power updates buffer to visualization server at a fixed interval; and 8. Visualization server sends updates to clients on a web-socket.

This pathway illustrates a process for data received from a power system network 101. An event manager 104 may buffer each data stream at different intervals to the level the 3-D visualization can handle. Note that even though data may be sent with very low latency, with an average delay of less than one millisecond, the visualization requirements needs minimization of data. In fact, the animations may be slowed considerably to be visible at all, because network communications can occur in a fraction of a second. The ability to query Elasticsearch (database for indexing data sets) for the exact time-stamped data makes up for this slowdown and ensures the data (e.g. research data) are still pinpoint accurate.

To ensure that all clients are keyed into what is happening in their emulation instance, a visualization server 170 may run a session management service. Such a service may map the ZeroMQ socket (an asynchronous messaging library) to experiment instances, and experiment instance to clients, and can store this information in a database, MongoDB (database for indexing data sets). Once a client is interacting with a visualization, they can control the zoom level of the camera, and therefore the zoom level of the data itself. The visualization may have certain break points in zoom level to co-locate multiple objects—for instance a set of buildings—into a single object, perhaps a city.

This means that the visualization server may need to know which 3-D instance a client is viewing at any time and the level to which each client is magnified to send the right granularity of data to each client. A client viewing the buildings, along with individual transmission lines and transformers, may need every power update, but at the city level needs only approximate values. A filter may be set between packaging the data and the web socket that essentially works like a valve on a fire hydrant, controlling the stream of data to avoid flooding the client with useless data.

Real-Time Visual Analysis: Using ZeroMQ PUB-SUB sockets, the an application may achieve very low latency data streams as well as high-throughput message passing between individual processes. This communication fabric using ZeroMQ enables the current level of responsiveness and accuracy of the experiment in this system possible. Another feature available through the usage of the PUB-SUB model is the simultaneous availability of streaming real-time data to any application subscribing to the right PUB socket. In case a third-party application connected to the visualization server 170 data stream(s) requires the stream(s) to be filtered or parsed, a custom script may be used to handle the data before relaying it out to any dependent applications. Data may be serialized for transport on ZeroMQ sockets using Protocol Buffers. Protocol buffers, also known as protobuf, are a light and simple method for serializing structured data usable for a variety of different applications.

Historical Data Analysis: All data streams may be passed to indexes in the Elasticsearch database. Each data point may be associated with a time stamp. Thus, it is possible to query the database for historical events in the simulation as well as go back in time and replay the simulation from the available data. By storing the data in a database, any interested party may be granted network access to the database and hence query any data needed for analysis. Because this database stores all data, it is important to have large storage space to accommodate large and/or long-running experiments.

Hardware-in-the-Loop Capability: The ability to link cyber-physical systems with the emulated devices in an environment is recognized as a primary capability for research, development, testing, and validation for cyber-physical systems. By integrating real physical networks with the emulated environment, any real device may be brought into this environment. As long as the network traffic passes through the emulated network, it may be captured, logged, and visualized by the environment.

Robust Data Transport and Storage: Leveraging GO, ZeroMQ, Filebeat, Logstash and Elasticsearch together, this capability can achieve robust data transport and storage. This may be done by the simultaneous availability of real-time data streams on ZeroMQ PUB sockets as well as all historical data, collected via the Filebeat or Logstash services and custom GO scripts, on the Elasticsearch database. The integrity of the database may be maintained using the backup and redundancy features available in Elasticsearch.

Computer Forensics: The capability includes functionality to visualize alerts from a series of different IDS simultaneously. Alert data may also be stored in a database so that a user can query the central database for alerts data as well as system logs associated to incident or events related. Due to the availability of both real-time and historical data, both types may be supplied to forensic analysis tools. The method and system links all system, network, security, and power grid state information to a central location for time-synchronized analysis and visual presentation of data to help answer the core questions following any incident. Namely, the who, what, when, where, why, and how.

Building Training Sets for Machine Learning: As the relationship between machine learning and resilience becomes more evident, so does the potential for the array of data sets collected to be used to build training sets for machine learning algorithms that, in turn, can link to autonomous response and recovery of systems, networks, and applications. The system hardware should ensure it has allocated sufficient resources for the collection and storage of these high-fidelity data sets that can be used for machine learning.

This cyber power capability provides an environment in which various kinds of IP-based hardware can be linked and evaluated. Hardware evaluation may include systems security as well as the state of resilience. Hardware may also be evaluated from the perspective of interoperability and/or optimization. Because a system can create the entire experiment environment, it can provide strong repeatability to experimental scenarios in the emulated environment and as a result provide great potential for automated firmware testing. Both the real-time and historic visualization capabilities of a visualization server 170 is capable of conveying important information about the incident in a clean and understandable manner for all audiences.

A visualization of the system may be multilayered to logically visualize the power grid/system (e.g., power system network 101), including a multitude of devices, a geographic context for reference, and/or a communication network with its full diversity of networked components. For example, a first layer may include power system network elements. A second layer may include elements of the communication network. And a third layer may provide the geographic context. The different layers may be overlaid, or viewed individually. Additionally, the visualization may be animated such that activity of the power system network and/or communication network may be illustrated. The multilayered functionality is illustrated in FIGS. 11A-11C, according to some embodiments of the present disclosure.

Figure 11A:
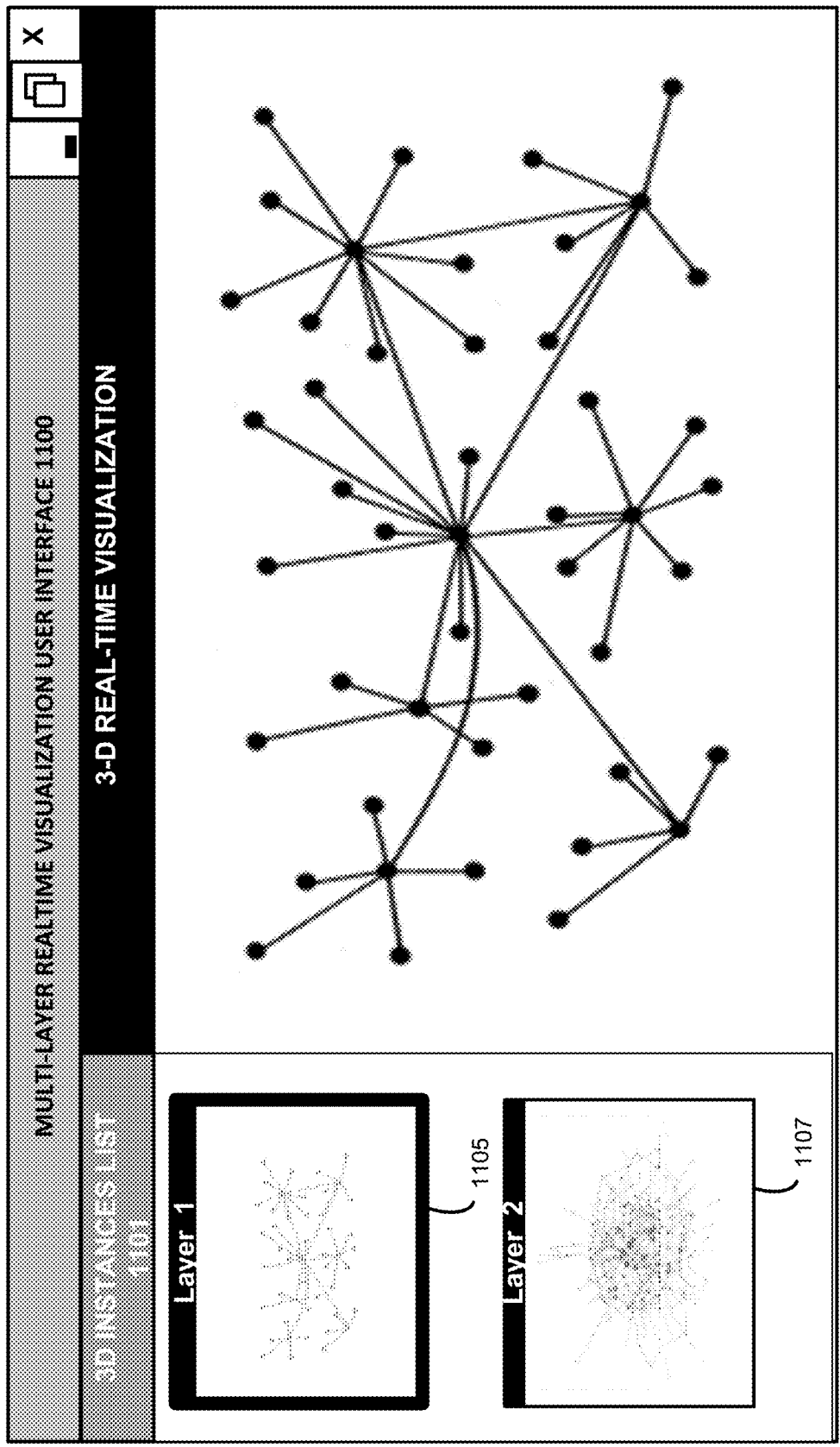
FIGS. 11A-11C illustrate a multilayer functionality of a visualization server in accordance with embodiments of the present disclosure.
Figure 11B:
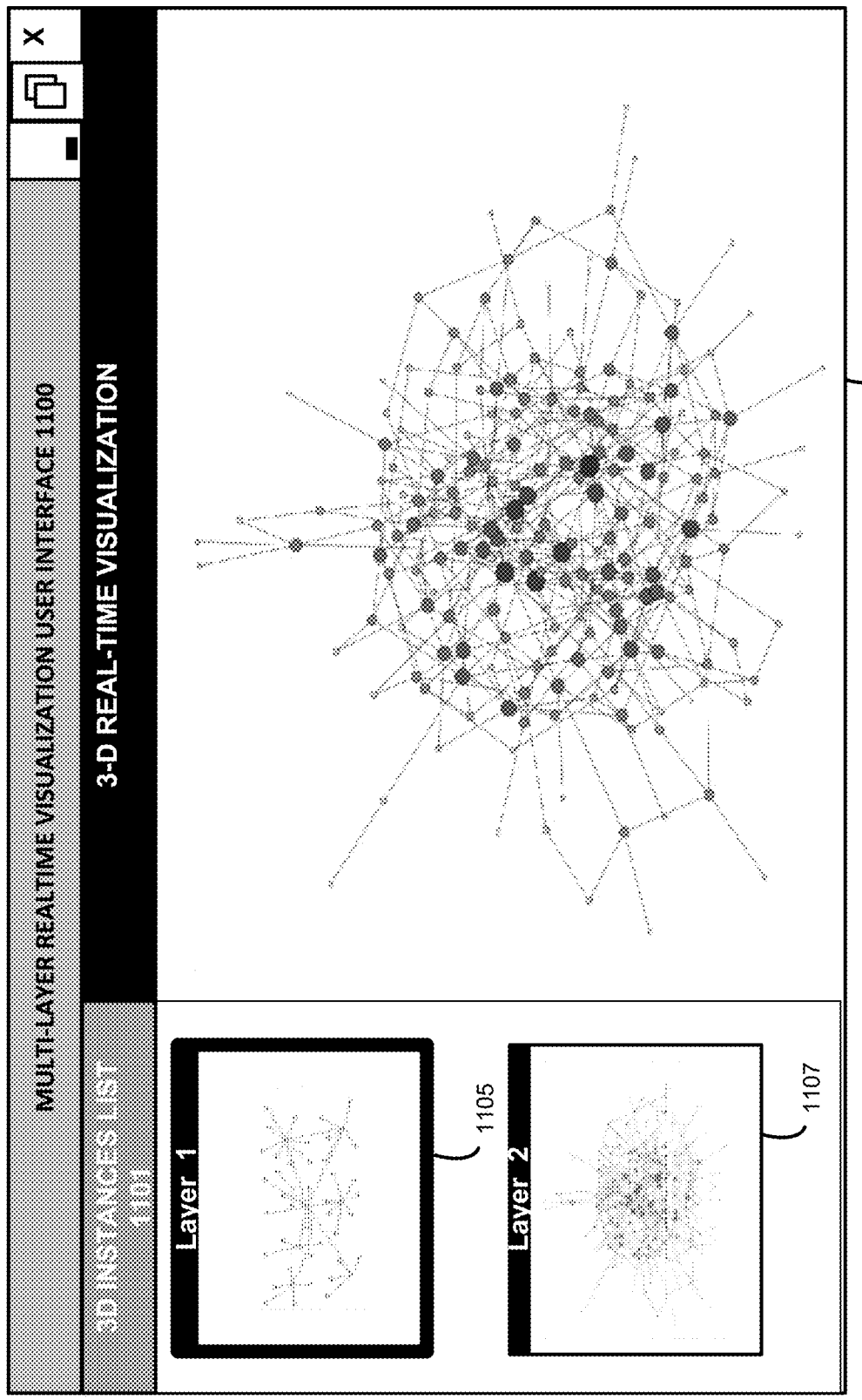
Figure 11C:
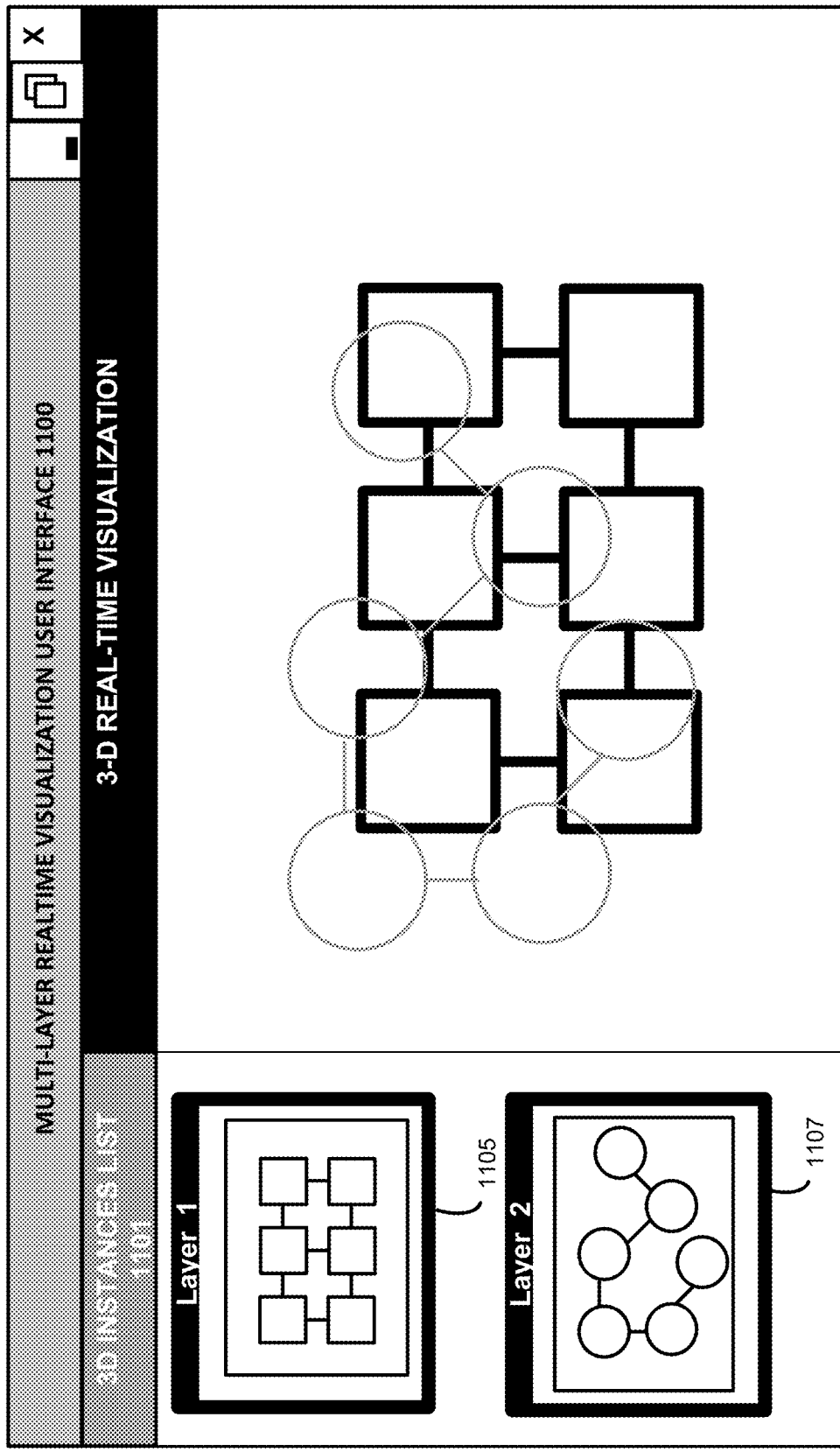

Referring to FIGS. 11A-11C, Layer_1 (1105) may depict power system network elements (e.g., the first layer). Layer_2)1107) may depict elements of the communication network. In FIG. 11A, the user is viewing the elements of the power system network (e.g., Layer_1 (1105)) In FIG. 11B, the user is viewing the elements of the communication network (e.g., Layer_2 (1107)). For example, the user 180 may toggle between the two views. Although, only two views/layers are shown, it is understood that a visualization server 170 may generate many more layers to be viewed by the user 180. FIG. 11C shows Layer_1 (1105) overlaid with Layer_2 (1107).

Figure 12:
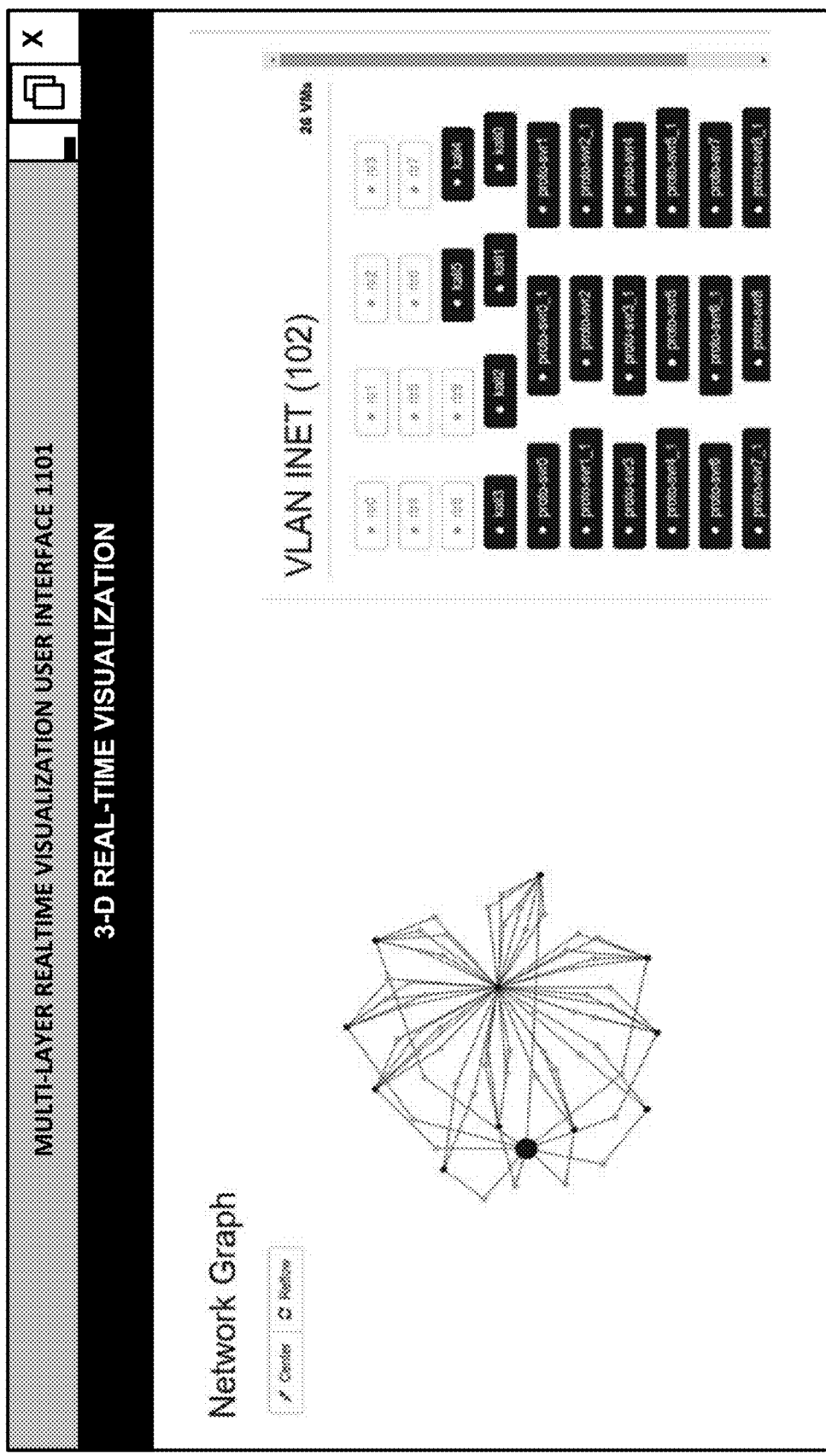
FIG. 12 illustrates an example graph of an emulated network generated using the visualization server in accordance with embodiments of the present disclosure.
Figure 13:
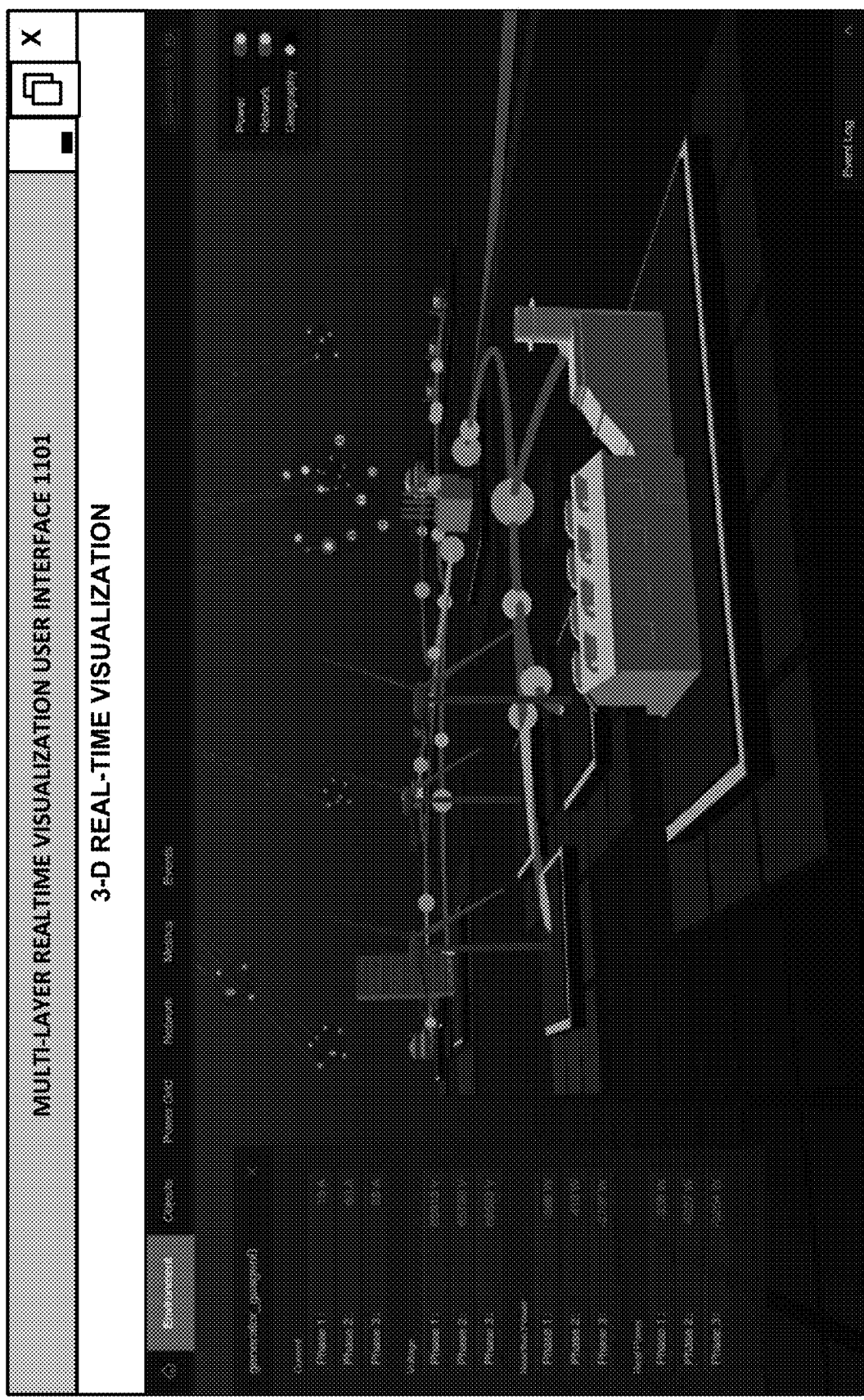
FIG. 13 illustrates an example of a power system visualization generated using the visualization server in accordance with embodiments of the present disclosure.
Figure 14:
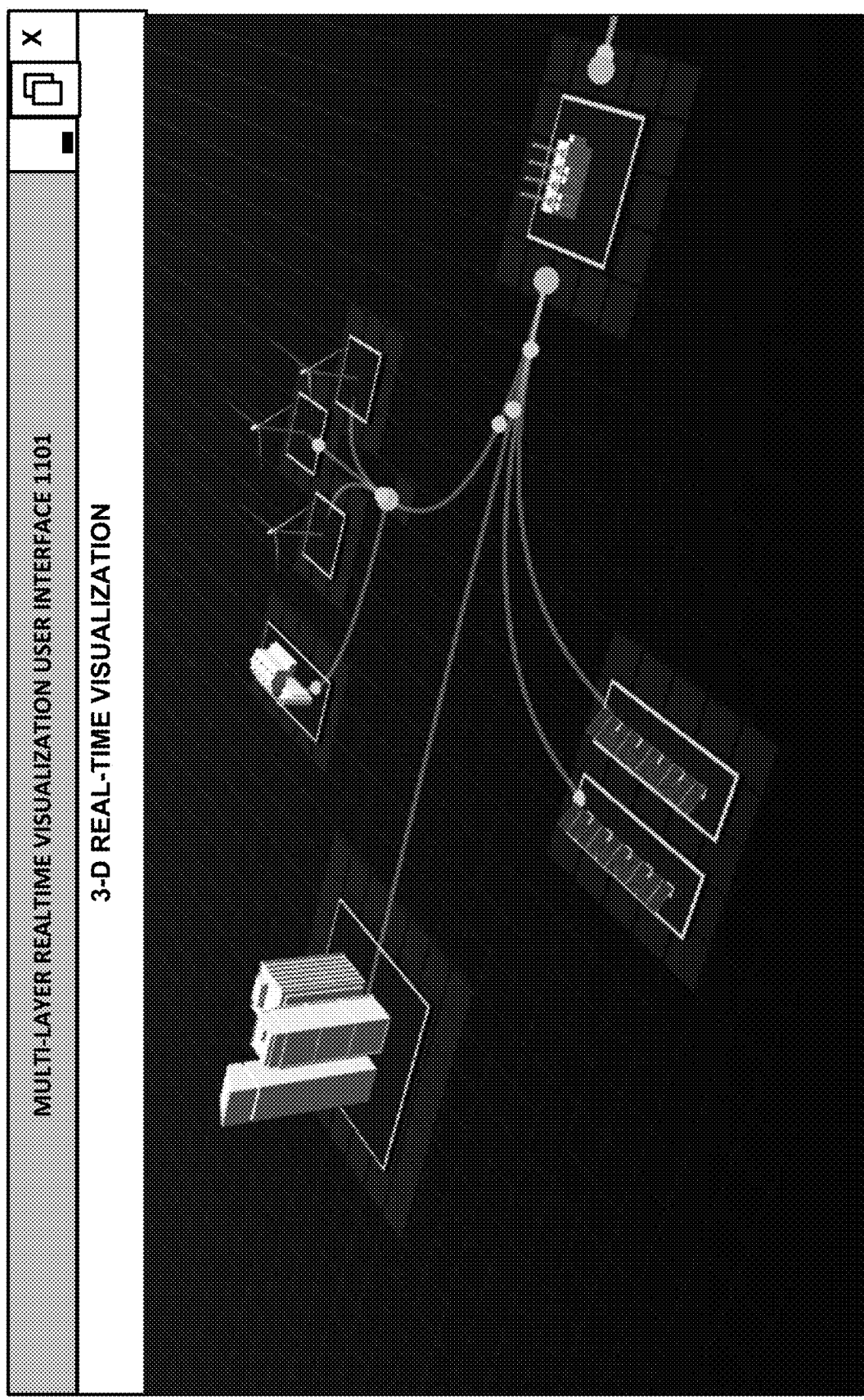
FIG. 14 depicts an example of generation elements of a power system with animation showing power system activity in accordance with embodiments of the present disclosure.
Figure 15:
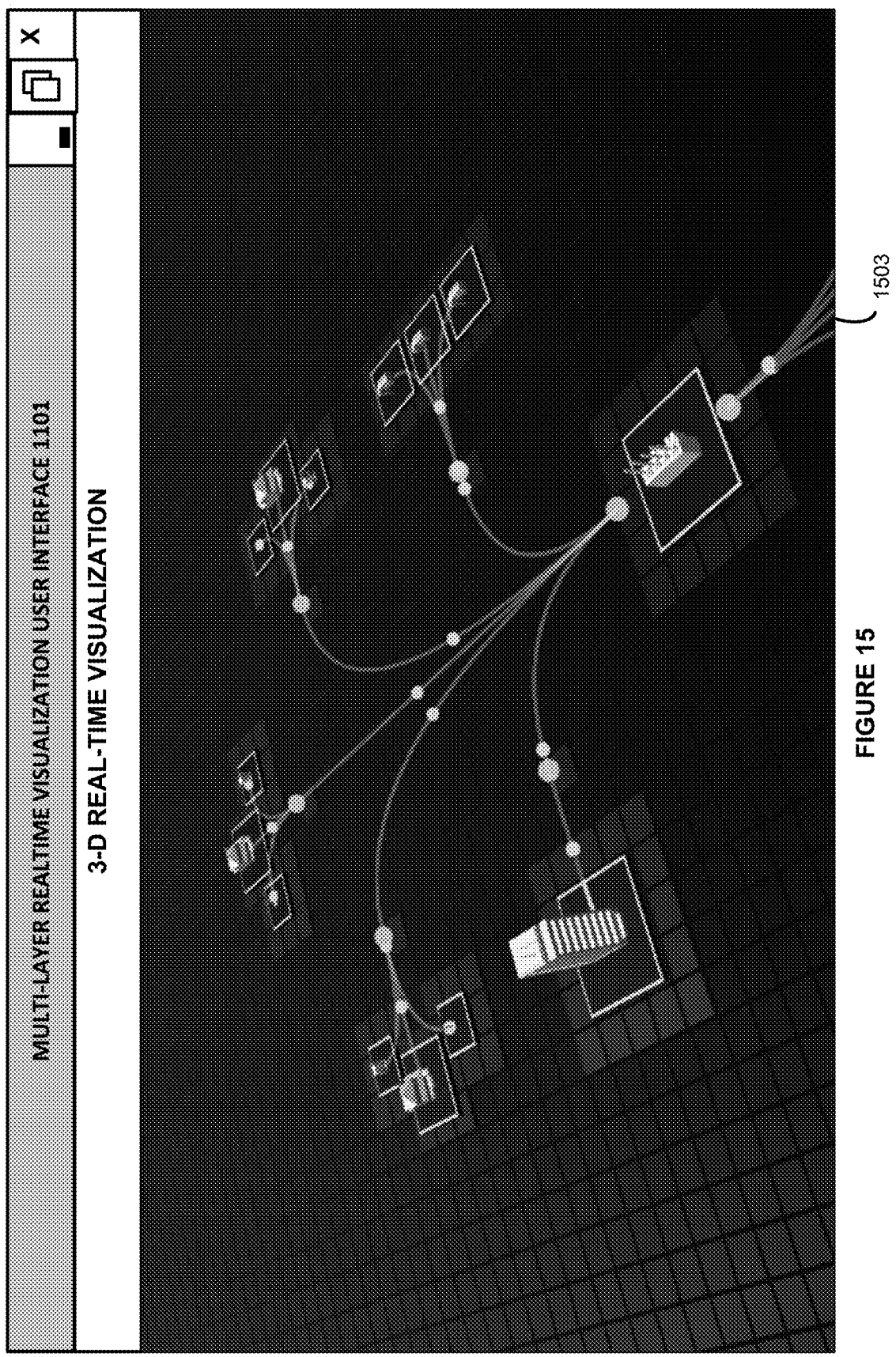
FIG. 15 depicts an example of distribution-side elements of a power system network with animation showing power system network activity in accordance with embodiments of the present disclosure.
Figure 16:
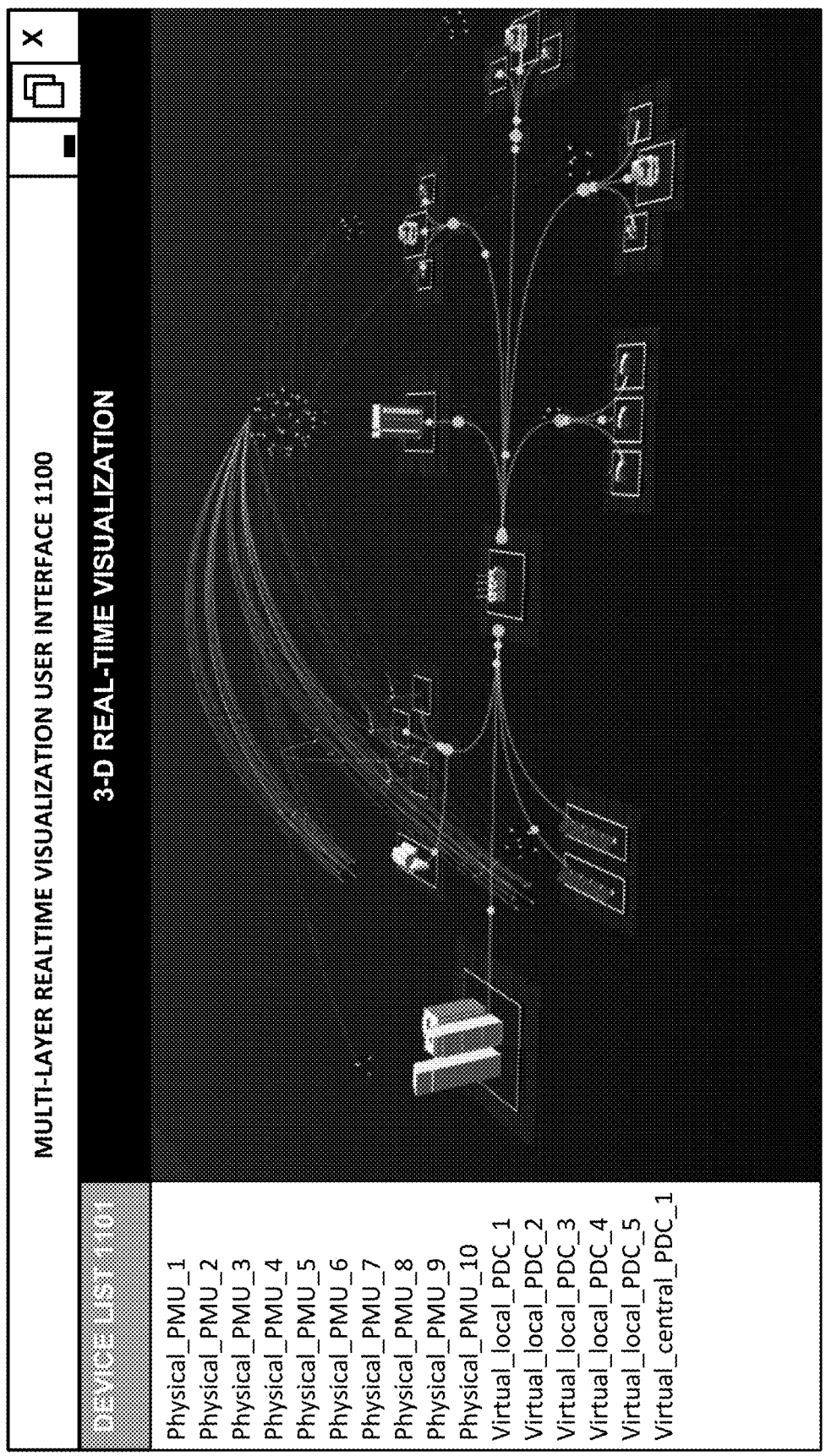
FIG. 16 illustrates an example of the integration of physical hardware devices with emulated devices using the visualization server in accordance with embodiments of the present disclosure.
Figure 17:
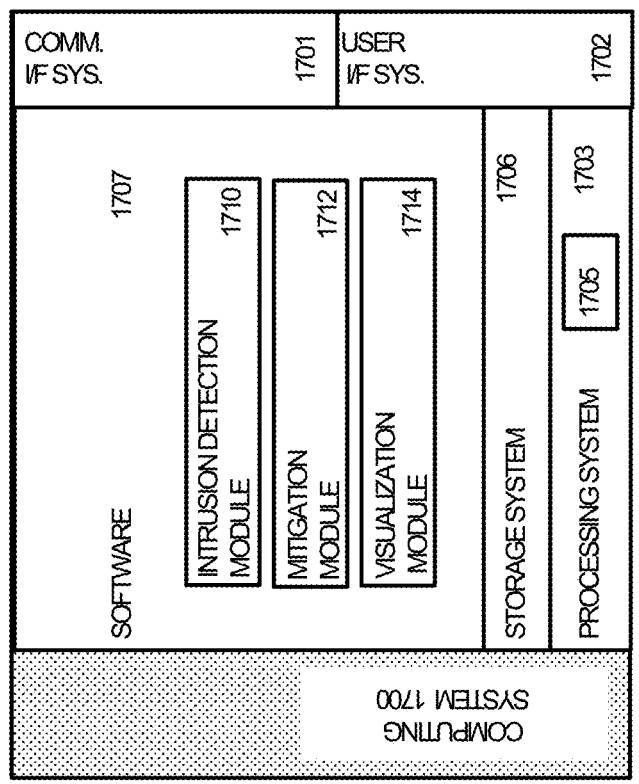
FIG. 17 illustrates a block diagram of a computer used to implement the method and system for power system network virtualization, visualization, intrusion detection, and mitigation in accordance with embodiments of the present disclosure.

FIGS. 12-17 are screenshots of the visualization platform in action, according to some embodiments of the present disclosure. FIG. 12 depicts a graph of an emulated network, according to some embodiments of the present disclosure. FIG. 13 depicts an example of a power system, according to some embodiments of the present disclosure. FIG. 14 depicts an example of generation elements of a power system with animation showing power system activity, according to some embodiments of the present disclosure. FIG. 15 depicts an example of distribution-side elements of a power system with animation showing power system activity, according to some embodiments of the present disclosure. FIG. 16 depicts an example of the integration of physical hardware devices with emulated devices using the visualization server, according to some embodiments of the present disclosure. Physical and emulated devices are listed together in the device list 1101. FIG. 17 illustrates a computing system 1700 used provide power system virtualization, visualization, and intrusion detection and mitigation as described herein, according to one implementation, according to some embodiments of the present disclosure.

A computing system 1700 is representative of any computing system or systems with which the various operational architectures, processes, scenarios, and sequences disclosed herein for providing a robust multi-component platform that performs intrusion detection, intrusion mitigation, and real-time visualization of a power system network and detected intrusions may be implemented.

A computing system 1700 is an example of cyber-security systems 100, 100A-C, and 300 (excluding the power system network 101), although other examples may exist. A computing system 1700 may include a communication interface 1701, a user interface 1702, and a processing system 1703. The processing system 1703 may be linked to a communication interface 1701 and/or a user interface 1702. A processing system 1703 may include a microprocessor and/or processing circuitry 1705 and/or a memory device 1706 that stores operating software 1707. A computing system 1700 may include other well-known components such as a battery and/or enclosure (not shown). In some embodiments of the present disclosure, a computing system 1700 may include at least one of a server, a user device, a desktop computer, a laptop computer, a tablet computing device, and/or some other user communication apparatus.

In some embodiments of the present disclosure, a communication interface 1701 may include components that communicate over communication links, such as at least one of network cards, ports, radio frequency (RF), processing circuitry and software, and/or some other communication devices. A communication interface 1701 may be configured to communicate over metallic, wireless, and/or optical links. Further, a communication interface 1701 may be configured to use Time Division Multiplex (TDM), Internet Protocol (IP), Ethernet, optical networking, wireless protocols, communication signaling, and/or some other communication format—including combinations thereof. In some implementations, a communication interface 1701 may be configured to communicate with other end user devices, where the communication interface may be used to transfer and/or receive voice communications for the devices.

In some embodiments of the present disclosure, a user interface 1702 may include components that interact with a user to receive user inputs and to present media and/or information. For example, a user interface 1702 may include a speaker, microphone, buttons, lights, display screen, touch screen, touch pad, scroll wheel, communication port, or some other user input/output apparatus—including combinations thereof. However, a user interface 1702 may be omitted, according to some embodiments of the present disclosure.

Processing circuitry 1705 may include a microprocessor and other circuitry that retrieves and/or executes the operating software 1707 from a memory device 1706. A memory device 1706 may include volatile and/or nonvolatile, removable and/or non-removable media implemented in any method or technology for storage of information, such as computer readable instructions, data structures, program modules, and/or other data. A memory device 1706 may be implemented as a single storage device, but may also be implemented across multiple storage devices or sub-systems. Further, a memory device 1706 may include additional elements, such as a controller to read the operating software 1707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

In some embodiments of the present disclosure, processing circuitry 1705 may be mounted on a circuit board that may also hold the memory device 1706 and portions of the communication interface 1701 and the user interface 1702. Operating software 1707 may include computer programs, firmware, and/or some other form of machine-readable program instructions. Operating software 1707 may include a log module 1708, although any number of software modules within the application may provide the same operation. Operating software 1707 may further include an operating system, utilities, drivers, network interfaces, applications, and/or some other type of software. When executed by the processing circuitry 1705, operating software 1707 may direct the processing system 1703 to operate the computing system 1700 as described herein.

In some embodiments of the present disclosure, an intrusion detection module 1710, when read and executed by processing system 1703, may direct a processing system 1703 to detect cyber-attacks in Supervisory Control and Data Acquisition (SCADA) power systems. An intrusion detection module 1710 may integrate logical system behavior, protocol-specific knowledge, and/or data-based learning to develop a comprehensive solution targeting the SCADA networks. For example, an intrusion detection module 1710 may integrate a first anomaly detector (e.g., model-based IDS), a second anomaly detector (e.g., a machine-learning based IDS), and/or a third anomaly detector (e.g., a signature-based IDS). Synchrophasor data may be collected via a synchrophasor network monitor to detect unknown, coordinated, and/or stealthy cyber-attacks targeting the SCADA networks. An intrusion detection module 1710 may also utilizes state-of-the-art machine learning to continuously improve intrusion detection. In some embodiments of the present disclosure, an intrusion detection module 1710 may use synchrophasor measurements and cyber logs to learn patterns of different scenarios based on spatio-temporal behaviors of power system networks. In some embodiments of the present disclosure, an intrusion detection module 1710 may detect anomalies during cyberattacks on a power system network and/or a communication system based on the rules defined in a first anomaly detector, a second anomaly detector, and a third anomaly detector, and then generate alerts that are published to the mitigation module 1712.

In some embodiments of the present disclosure, a mitigation module 1712, when read and executed by the processing system 1703, may direct a processing system 1703 to take corrective actions including reconfiguring the power and/or communication network to isolate a compromised device, and reconfiguring the network to connect a new device to replace the compromised device.

In some embodiments of the present disclosure, a visualization module 1714, when read and executed by the processing system 1703, may direct the processing system 1703 to generates a user interface (UI) viewable through a single web interface, which can provide a user with a real-time three-dimensional (3D) visualization of large-scale environments involving cyber-physical devices. A visualization module 1714 may highlight any detected intrusions/attacks/undesirable events (e.g., visual indication, animation, etc.), and allow the user to interact with the system to initiate corrective actions.

It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the disclosure is not limited to the specific implementations described above, but only by the claims and their equivalents.

Example Set #1

Example 1. A first cyber-security system comprising: a supervisory control and data acquisition (SCADA) network monitor configured to receive a first data set from a power system network; an event manager; and a mitigation system, wherein: the SCADA network monitor comprises a first anomaly detector configured to: compare the first data set to a modeled data set to identify in the first data set a first anomaly occurring in the power system network, and in response to identifying the first anomaly, pass a first alert signal corresponding to the first anomaly to the event manager; the event manager is configured to: evaluate the first alert signal; and when the event manager determines that the first alert signal corresponds to at least one of an intrusion or an undesirable event, pass the first alert signal to the mitigation system; and in response to receiving the first alert signal, the mitigation system is configured to perform a first corrective action affecting the power system network.

Example 2. The first cyber-security system of claim 1, wherein the first data set comprises at least one of timing data, frequency data, or range data.

Example 3. The first cyber-security system of claim 2, wherein the first data set comprises timing data, and wherein the modeled data set comprises a packet latency threshold.

Example 4. The first cyber-security system of claim 2, wherein the first data set comprises range data, and wherein the modeled data set comprises a packet size range.

Example 5. The first cyber-security system of claim 2, wherein the first data set comprises frequency data, and wherein the modeled data set comprises a packet frequency threshold.

Example 6. The first cyber-security system of claim 1, wherein: the mitigation system is configured to: receive, from the event manager, the first alert signal; process the first alert signal; and send a control signal to a namespace container orchestrator; and the namespace container orchestrator is configured to: isolate the at least one of the intrusion or the undesirable event; and reconfigure the power system network.

Example 7. A second cyber-security system comprising: a synchrophasor network monitor configured to receive time-stamped phasor data from a power system network; an event manager; and a mitigation system, wherein: the synchrophasor network monitor comprises a second anomaly detector configured to: compare the time-stamped phasor data to a learning data set to identify in the time-stamped phasor data a second anomaly occurring in the power system network; and in response to identifying the second anomaly, pass a second alert signal corresponding to the second anomaly to the event manager; the event manager is configured to: evaluate the second alert signal; and when the event manager determines that the second alert signal corresponds to at least one of an intrusion or an undesirable event, pass the second alert signal to the mitigation system; and in response to receiving the second alert signal, the mitigation system is configured to perform a second corrective action affecting the power system network.

Example 8. The second cyber-security system of claim 7, wherein the time-stamped phasor data comprises at least one of a voltage or a current.

Example 9. The second cyber-security system of claim 7, wherein: the mitigation system is configured to: receive, from the event manager, the second alert signal; process the second alert signal; and send a control signal to a namespace container orchestrator; and the namespace container orchestrator is configured to: isolate the at least one of the intrusion or the undesirable event; and reconfigure the power system network.

Example 10. The second cyber-security system of claim 7, wherein the synchrophasor network monitor comprises a Phasor Data Concentrator (PDC), and wherein the time-stamped phasor data is received from a Phasor Measurement Unit (PMU).

Example 11. The first cyber-security system of claim 1, further comprising: a synchrophasor network monitor configured to receive time-stamped phasor data from the power system network, wherein: the synchrophasor network monitor comprises a second anomaly detector configured to: receive, from the SCADA network monitor, the first data set; generate, from at least one of the first data set or the time-stamped phasor data, a learning data set; compare the time-stamped phasor data to the learning data set to identify in the time-stamped phasor data a second anomaly occurring in the power system network; and in response to identifying the second anomaly, pass a second alert signal corresponding to the second anomaly to the event manager; the event manager is further configured to: evaluate the second alert signal; and when the event manager determines that the second alert signal corresponds to at least one of an intrusion or an undesirable event, pass the second alert signal to the mitigation system; and in response to receiving the second alert signal, the mitigation system is configured to perform a second corrective action affecting the power system network.

Example 12. A third cyber-security system comprising: a supervisory control and data acquisition (SCADA) network monitor configured to receive a second data set from a power system network; an event manager; and a mitigation system, wherein: the SCADA network monitor comprises a third anomaly detector configured to: compare the second data set to a historical data set to identify in the second data set a third anomaly in the power system network; and in response to identifying the third anomaly, pass a third alert signal corresponding to the third anomaly to the event manager; the event manager is configured to: evaluate the third alert signal; and when the event manager determines that the third alert signal corresponds to at least one of an intrusion or an undesirable event, pass the third alert signal to the mitigation system; and in response to receiving the third alert signal, the mitigation system is configured to perform a third corrective action affecting the power system network.

Example 13. The third cyber-security system of claim 12, wherein the second data set comprises a whitelist including at least one of a MAC address, an IP address, an ethernet port number, a network port number, a transport port number, a SCADA protocol, or a SCADA function code.

Example 14. The third cyber-security system of claim 12, wherein: the mitigation system is configured to: receive, from the event manager, the third alert signal; process the third alert signal; and send a control signal to a namespace container orchestrator; and the namespace container orchestrator is configured to: isolate the at least one of the intrusion or the undesirable event; and reconfigure the power system network.

Example 15. The third cyber-security system of claim 12, wherein the historical data set comprises a known attack signature.

Example 16. The first cyber-security system of claim 11, wherein: the SCADA network monitor is further configured to receive a second data set from the power system network; and the SCADA network monitor further comprises a third anomaly detector configured to: compare the second data set to a historical data set to identify in the second data set a third anomaly occurring in the power system network; and in response to identifying the third anomaly, pass a third alert signal corresponding to the third anomaly to the event manager; the event manager is further configured to: evaluate the third alert signal; and when the event manager determines that the third alert signal corresponds to at least one of an intrusion or an undesirable event, pass the third alert signal to the mitigation system; and in response to receiving the third alert signal, the mitigation system is configured to perform a third corrective action affecting the power system network.

Example 17. A mitigation system for a power system network, the mitigation system comprising: a namespace container orchestrator, wherein: the mitigation system is configured to: receive, from an event manager, an alert signal corresponding to at least one of an intrusion or an undesirable event; process the alert signal; and send a control signal to the namespace container orchestrator; and the namespace container orchestrator is configured to: isolate the at least one of the intrusion or the undesirable event; and reconfigure the power system network.

Example 18. A mitigation system for a power system network, the mitigation system comprising: a network controller configured to manage a software defined network portion of the power system network; a namespace container orchestrator configured to: modify, in response to a control signal, a network configuration of an element in the software defined network portion of the power system network; and direct a new network configuration of the element of the software defined network portion of the power system network to the network controller.

Example 19. The mitigation system of claim 18, wherein the control signal comprises an alert signal received from an external agent.

Example 20. The mitigation system of claim 18, wherein the control signal comprises an automatic action by the mitigation system.

Example 21. The mitigation system of claim 18, wherein the control signal comprises a command from a user.

Example 22. The mitigation system of claim 18, wherein the control signal comprises an alert signal corresponding to at least one of an intrusion or an undesirable event received from an event manager.

Example 23. The mitigation system of claim 18, wherein the element in the software defined network portion of the power system network comprises a Phasor Data Concentrator (PDC).

Example 24. A multi-layered real-time visualization server to visualize a power system network, the visualization server comprising: a processor; and a computer readable storage medium having stored thereon an instruction, wherein: when the instruction is to be executed, the processor is configured to: generate a first visualization layer, wherein the first visualization layer depicts a power system element of the power system network; generate a second visualization layer, wherein the second visualization layer depicts a communication network element of a communication network; and transfer, for display on a user interface, the first visualization layer overlaid with the second visualization layer.

Example 25. The multi-layered real-time visualization server of claim 24, wherein the power system element comprises a power generation element.

Example 26. The multi-layered real-time visualization server of claim 24, wherein the power system element comprises a distribution side element.

Example 27. The multi-layered real-time visualization server of claim 24, wherein the first visualization layer includes an animation depicting power system activity of the power system network.

Example 28. The multi-layered real-time visualization server of claim 24, further comprising: instructions that when executed by the processor, cause the processor to: generate a visual indication of a detected anomaly.

Example 29. The multi-layered real-time visualization server of claim 28, wherein the visual indication of the detected anomaly comprises at least one of an arc height or a color.

Example Set #2

Example 1. A first cyber-security method comprising: receiving, via a supervisory control and data acquisition (SCADA) network monitor, a first data set from a power system network; comparing, via a first anomaly detector, the first data set to a modeled data set to identify in the first data set a first anomaly occurring in the power system network; in response to identifying the first anomaly, pass a first alert signal corresponding to the first anomaly to an event manager; evaluating, via the event manager, the first alert signal; in response to determining that the first alert signal corresponds to at least one of an intrusion or an undesirable event, passing the first alert signal to a mitigation system; and performing, in the mitigation system and after receiving the first alert signal, a first corrective action affecting the power system network.

Example 2. The first cyber-security method of claim 1, wherein the first data set comprises at least one of timing data, frequency data, or range data.

Example 3. The first cyber-security method of claim 2, wherein the first data set comprises timing data, and wherein the modeled data set comprises a packet latency threshold.

Example 4. The first cyber-security method of claim 2, wherein the first data set comprises range data, and wherein the modeled data set comprises a packet size range.

Example 5. The first cyber-security method of claim 2, wherein the first data set comprises frequency data, and wherein the modeled data set comprises a packet frequency threshold.

Example 6. The first cyber-security method of claim 1, further comprising: receiving the first alert signal; processing the first alert signal; isolating the at least one of the intrusion or the undesirable event; and reconfiguring the power system network.

Example 7. A second cyber-security method comprising: receiving, via a synchrophasor network monitor, time-stamped phasor data from a power system network; comparing, via a second anomaly detector the time-stamped phasor data to a learning data set to identify in the time-stamped phasor data a second anomaly occurring in the power system network; in response to identifying the second anomaly, passing a second alert signal corresponding to the second anomaly to an event manager; processing, via the event manager, the second alert signal when the second alert signal corresponds to at least one of an intrusion or an undesirable event, passing the second alert signal to the mitigation system; receiving, in the mitigation system, the second alert signal; and performing a second corrective action affecting the power system network.

Example 8. The second cyber-security method of claim 7, wherein the time-stamped phasor data comprise at least one of a voltage or current.

Example 9. The second cyber-security method of claim 7, further comprising: sending a control signal to a namespace container orchestrator; isolating, via the namespace container orchestrator, the at least one of the intrusion or the undesirable event; and reconfiguring, via the namespace container orchestrator, the power system network.

Example 10. The second cyber-security method of claim 7, wherein the time-stamped phasor data is received from a Phasor Measurement Unit (PMU)

Example 11. The first cyber-security method of claim 1, further comprising: receiving, via a synchrophasor network monitor, time-stamped phasor data from the power system network; receiving, in a second anomaly detector via the SCADA network monitor, the first data set; generating, from at least one of the first data set or the time-stamped phasor data, a learning data set; comparing the time-stamped phasor data to the learning data set to identify in the time-stamped phasor data a second anomaly occurring in the power system network; in response to identifying the second anomaly, passing a second alert signal corresponding to the second anomaly to the event manager; evaluating, in the event manager, the second alert signal; when the event manager determines that the second alert signal corresponds to at least one of an intrusion or an undesirable event, passing the second alert signal to the mitigation system; and performing, in the mitigation system and in response to receiving the second alert signal, a second corrective action affecting the power system network.

Example 12. A third cyber-security method comprising: receiving, via a supervisory control and data acquisition (SCADA) network monitor, a second data set from a power system network; comparing, via a third anomaly detector, the second data set to a historical data set to identify in the second data set a third anomaly in the power system network; and in response to identifying the third anomaly, passing a third alert signal corresponding to the third anomaly to an event manager; evaluating, via the event manager the third alert signal; when the event manager determines that the third alert signal corresponds to at least one of an intrusion or an undesirable event, passing the third alert signal to a mitigation system; and performing, via the mitigation system, a third corrective action affecting the power system network.

Example 13. The third cyber-security method of claim 12, wherein the second data set comprises a whitelist including at least one of a MAC address, an IP address, an ethernet port number, a network port number, a transport port number, a SCADA protocol, or a SCADA function code.

Example 14. The third cyber-security method of claim M4, further comprising: sending a control signal to a namespace container orchestrator; isolating, via the namespace container orchestrator, the at least one of the intrusion or the undesirable event; and reconfiguring, via the namespace container orchestrator, the power system network.

Example 15. The third cyber-security method of claim 12, wherein the historical data set comprises a known attack signature.

Example 16. The first cyber-security method of claim 11, further comprising: receiving a second data set from the power system network; comparing, via a third anomaly detector, the second data set to a historical data set to identify in the second data set a third anomaly occurring in the power system network; in response to identifying the third anomaly, passing a third alert signal corresponding to the third anomaly to the event manager; evaluating, via the event manager, the third alert signal; when the event manager determines that the third alert signal corresponds to at least one of an intrusion or an undesirable event, passing the third alert signal to the mitigation system; and performing, via the mitigation system, a third corrective action affecting the power system network.

Example 17. A method for intrusion mitigation in a power system network, the method comprising: managing a software defined network portion of the power system network; modifying, in response to a control signal, network configurations of an element in the software defined network portion of the power system network; and directing new network configurations of the element of the software defined network portion of the power system network to the network controller.

Example 18. The method of claim 17, wherein the control signal comprises an alert signal received from an external agent.

Example 19. The method of claim 17, wherein the control signal comprises an automatic action by the mitigation system Example 20. The method of claim 17, wherein the control signal comprises a command from a user.

Example 21. The method of claim 17, wherein the control signal comprises an alert signal corresponding to at least one of an intrusion or an undesirable received from an event manager.

Example 22. A method of providing a multi-layered real-time visualization display of a power system network, the method comprising: generating a first visualization layer, wherein the first visualization layer depicts a power system element of the power system network; generating a second visualization layer, wherein the second visualization layer depicts a communication network element of a communication network; and display, via a user interface, the first visualization layer overlaid with the second visualization layer.

Example 23. The method claim 22, wherein the first visualization layer includes an animation depicting power system activity of the power system network.

Example 24. The method of claim 22, further comprising: generating a visual indication of a detected anomaly.

Example 25. The method of claim 24, wherein the visual indication of the detected anomaly comprises at least one of an arc height or a color.

Example 26. The method of claim 17, wherein the element in the software defined network portion of the power system network comprises a Phasor Data Concentrator (PDC).

Example 27. The method of claim 22, wherein the power system element comprises a power generation element.

Example 28. The method of claim 22, wherein the power system element comprises a distribution side element.

Any one or more of the aspects/embodiments as substantially disclosed herein. Any one or more of the aspects/embodiments as substantially disclosed herein optionally in combination with any one or more other aspects/embodiments as substantially disclosed herein. One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together. The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A cyber-security system comprising:
   a supervisory control and data acquisition (SCADA) network monitor configured to receive a first data set from a power system network;
   a synchrophasor network monitor configured to receive time-stamped phasor data from the power system network;
   an event manager; and
   a mitigation system, wherein:
   the SCADA network monitor comprises a first anomaly detector configured to:
      compare the first data set to a modeled data set to identify in the first data set a first anomaly occurring in the power system network;
      in response to identifying the first anomaly, generate a first alert signal corresponding to the first anomaly; and
      send the first alert signal to the event manager;
   the synchrophasor network monitor comprises a second anomaly detector configured to:

compare the time-stamped phasor data to a learning data set to identify in the time-stamped phasor data a second anomaly occurring in the power system network; and in response to identifying the second anomaly, pass a second alert signal corresponding to the second anomaly to the event manager;

the event manager is configured to:

receive the first alert signal from the first anomaly detector;

receive the second alert signal from the second anomaly detector;

evaluate the first alert signal and the second alert signal;

determine if the first alert signal corresponds to at least one of a first intrusion or a first undesirable event;

determine if the second alert signal corresponds to at least one of a second intrusion and a second undesirable event;

in response to determining the first alert signal corresponds to the at least one of the first intrusion or the first undesirable event, pass the first alert signal to the mitigation system; and in response to determining the second alert signal corresponds to at least one of the second intrusion or the second undesirable event, pass the second alert signal to the mitigation system; and the mitigation system is configured to:

receive the first alert signal from the event manager;

receive the second alert signal from the event manager;

in response to receiving the first alert signal, perform a first corrective action affecting the power system network; and in response to receiving the second alert signal, perform a second corrective action affecting the power system network.

2. The cyber-security system of claim 1, wherein the first data set comprises at least one of timing data, frequency data, or range data.

3. The cyber-security system of claim 2, wherein the first data set comprises timing data, and the modeled data set comprises a packet latency threshold.

4. The cyber-security system of claim 2, wherein the first data set comprises range data, and the modeled data set comprises a packet size range.

5. The cyber-security system of claim 2, wherein the first data set comprises frequency data, and the modeled data set comprises a packet frequency threshold.

6. The cyber-security system of claim 1, wherein:

the mitigation system is configured to:

process the first alert signal; and send a control signal to a namespace container orchestrator; and the namespace container orchestrator is configured to:

isolate the at least one of the first intrusion or the first undesirable event; and reconfigure the power system network.

7. The cyber-security system of claim 1, wherein:

the SCADA network monitor is further configured to receive a second data set from the power system network, the SCADA network monitor further comprises a third anomaly detector configured to:

compare the second data set to a historical data set to identify in the second data set a third anomaly in the power system network; and in response to identifying the third anomaly, pass a third alert signal corresponding to the third anomaly to the event manager;

the event manager is further configured to:

evaluate the third alert signal;

determine the third alert signal corresponds to a third at least one of a third intrusion or a third undesirable event; and in response to determining the third alert signal corresponds to at least one of the third intrusion or the third undesirable event, pass the third alert signal to the mitigation system; and the mitigation system is further configured to:

receive the third alert signal from the event manager; and in response to receiving the third alert signal, perform a third corrective action affecting the power system network.

8. A cyber-security method comprising:

receiving from a power system network:

a first data set via a supervisory control and data acquisition (SCADA) network monitor; and time-stamped phasor data via a synchrophasor network monitor;

in a first anomaly detector:

comparing the first data set to a modeled data set to identify in the first data set a first anomaly occurring in the power system network; and in response to identifying the first anomaly, generating a first alert signal corresponding to the first anomaly;

in a second anomaly detector:

receiving the first data set;

generating, from at least one of the first data set or the time-stamped phasor data, a learning data set;

comparing the time-stamped phasor data to the learning data set to identify in the time-stamped phasor data a second anomaly occurring in the power system network; and in response to identifying the second anomaly, generating a second alert signal corresponding to the second anomaly;

sending the first alert signal and the second alert signal to an event manager;

evaluating, in the event manager, the first alert signal and the second alert signal;

determining, in the event manager, if the first alert signal corresponds to at least one of a first intrusion or a first undesirable event and if the second alert signal corresponds to at least one of a second intrusion or a second undesirable event;

in response to determining that at least one of the first alert signal corresponds to the at least one of the first intrusion or the first undesirable event or the second alert signal corresponds to the at least one of the second intrusion or the second undesirable event, passing, via the event manager, at least one of the first alert signal or the second alert signal to a mitigation system;

receiving, in the mitigation system, at least one of the first alert signal or the second alert signal; and in the mitigation system, in response to receiving at least one of the first alert signal or the second alert signal, performing at least one of a first corrective action or a second corrective action affecting the power system network.

9. The cyber-security method of claim 8, further comprising:
- receiving a second data set from the power system network;
- comparing, via a third anomaly detector, the second data set to a historical data set to identify in the second data set a third anomaly occurring in the power system network;
- in response to identifying the third anomaly, passing a third alert signal corresponding to the third anomaly to the event manager;
- evaluating, via the event manager, the third alert signal;
- when the event manager determines that the third alert signal corresponds to at least one of a third intrusion or a third undesirable event, passing the third alert signal to the mitigation system; and
- performing, via the mitigation system, a third corrective action affecting the power system network.

\* \* \* \* \*